(12) United States Patent
Beyon et al.

(10) Patent No.: US 9,007,570 B1
(45) Date of Patent: Apr. 14, 2015

(54) AIRBORNE WIND PROFILING ALGORITHM FOR DOPPLER WIND LIDAR

(71) Applicant: The United States of America as represented by the Administrator of the National Aeronautics and Space Administration, Washington, DC (US)

(72) Inventors: Jeffrey Y. Beyon, Yorktown, VA (US); Grady J. Koch, Yorktown, VA (US); Michael J. Kavaya, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/079,914

(22) Filed: Nov. 14, 2013

Related U.S. Application Data

(60) Provisional application No. 61/751,291, filed on Jan. 11, 2013, provisional application No. 61/809,664, filed on Apr. 8, 2013, provisional application No. 61/820,478, filed on May 7, 2013, provisional application No. 61/820,957, filed on May 8, 2013.

(51) Int. Cl.
$G01S\ 17/95$ (2006.01)

(52) U.S. Cl.
CPC .................................... $G01S\ 17/95$ (2013.01)

(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 7,311,000 B2 | 12/2007 | Smith et al. | |
| 7,499,181 B2 | 3/2009 | Mirand et al. | |
| 7,827,861 B2 | 11/2010 | LaWhite et al. | |
| 2008/0297762 A1* | 12/2008 | Crowe | 356/5.03 |
| 2010/0014066 A1* | 1/2010 | Becker et al. | 356/28 |
| 2013/0162976 A1* | 6/2013 | Dakin et al. | 356/28.5 |

OTHER PUBLICATIONS

Beyon, Jeffrey Y., et al., "Airborne Wind Profiling with the Data Acquisition and Processing System for a Pulsed 2-Micron Coherent Doppler Lidar System," SPIE Defense, Security and Sensing 2012, Apr. 23-27, 2012, pp. 1-8, Baltimore, MD.
Beyon, J.Y., et al., "Data Acquisition and Processing System for Airborne Wind Profiling with a Pulsed, 2-Micron, Coherent-Detection, Doppler Lidar System," 2010 Earth Science Technology Forum, Jun. 22-24, 2010, pp. 1-4, Arlington, VA.
Grady J. Koch, "Doppler Lidar Observations of an Atmospheric Thermal Providing Lift to Soaring Ospreys," NASA Technical Paper 20080015449, pp. 1-12.
Koch, Grady J., et al., "Three-dimensional Wind Profiling of Offshore Wind Energy Areas with Airborne Doppler Lidar;" Journal of Applied Remote Sensing, 2014, pp. 083662-1-083662-11, vol. 8.

(Continued)

*Primary Examiner* — Luke Ratcliffe
(74) *Attorney, Agent, or Firm* — Andrea Z. Warmbier; Jennifer L. Riley

(57) ABSTRACT

Systems, methods, and devices of the present invention enable airborne Doppler Wind LIDAR system measurements and INS/GPS measurements to be combined to estimate wind parameters and compensate for instrument misalignment. In a further embodiment, the wind speed and wind direction may be computed based on two orthogonal line-of-sight LIDAR returns.

18 Claims, 21 Drawing Sheets

(56) References Cited

OTHER PUBLICATIONS

Kavaya, Michael J., et al., "The DAWN Airborne, Wind-Profiling, Coherent-Detection Lidar System: Overview, Flight Results, and Plans." Journal of Atmospheric and Oceanic Technology, Apr. 2014, pp. 826-842, vol. 31.

Beyon, Jeffrey Y., et al., "Airborne Wind Profiling Algorithms for the Pulsed 2-Micron Coherent Doppler Lidar at NASA Langley Research Center," Proc. of SPIE, SPIE Defense, Security, and Sensing 2013, Apr. 29-May 3, 2013, pp. 87310K-1-87310K-7, vol. 8731, Baltimore, MD.

Yu, Jirong, et al., "1 J/pulse Q-switched 2 um Solid-State Laser," Optics Letters, Feb. 15, 2006, pp. 462-464, vol. 31, No. 4.

Beyon, Jeffrey Y., et al., "Noise Whitening in Airborne Wind Profiling with a Pulsed 2-Micron Coherent Doppler Lidar at NASA Langley Research Center," Proc. of SPIE, Laser Radar Technology and Application XVII, Apr. 23, 2012, pp. 83790N-1-83790N-7, vol. 8379, Baltimore, MD.

Beyon, Jeffrey Y., et al., "Development of the Data Acquisition and Processing System for a Pulsed 2-Micron Coherent Doppler Lidar System," Proc. of SPIE, Lidar Remote Sensing for Environmental Monitoring XI, Oct. 11, 2010, pp, 78600A-1-78600A-6, vol. 7860, Incheon, Republic of Korea.

Beyon, Jeffrey Y., et al., "Noise Normalization and Windowing Functions for VALIDAR in Wind Parameter Estimation," Proc. of SPIE, Laser Radar Technology and Applications XI, 2006, pp. 621404-1-621404-11, vol. 6214.

Koch, Grady J., et al., "Field Testing of a High-Energy 2-um Doppler Lidar," Journal of Applied Remote Sensing, Mar. 2, 2010, pp. 1-13, vol. 4.

Vermeesch, Kevin, et al., "Comparisons of Ground-Based, Radiosonde, and Aircraft Wind Measurements at the Howard University Beltsville Research Campus," Working Group on Space-Based Lidar Winds Meeting, Jun. 16-19, 2009, pp. 1-18, Wintergreen, VA.

Beyon, Jeffrey Y., et al., "Comparison of Theoretical and Empirical Statistics of Wind Measurements with Validation Lidar (VALIDAR)," Proc. of SPIE, Signal Processing, Sensor Fusion, and Target Recognition XVII, 2008, pp. 69681N-1-69681N-11 vol. 6968.

Beyon, Jeffrey Y., et al., "Novel Nonlinear Adaptive Doppler-Shift Estimation Technique for the Coherent Doppler Validation Lidar," Optical Engineering, Jan. 2007, pp. 016002-1-016002-10, vol. 46(1).

Beyon, Jeffrey Y., et al., "Signal Processing Techniques for Heterodyne Differential Absorption Lidar," Proc. of SPIE, Signal Processing; Sensor Fusion, and Target Recognition XVI, 2007, pp. 65671N-1-65671N-8, vol. 6567.

Koch, Grady J., et al., "High-Energy 2 um Doppler Lidar for Wind Measurements," Optical Engineering, Nov. 2007, pp. 116201-1-116201-14, vol. 46(11).

Beyon, Jeffrey Y., et al.; "Novel Nonlinear Adaptive Doppler Shift Estimation Technique (NADSET) for the Coherent Doppler Lidar System VALIDAR," Proc. of SPIE, Signal and Data Processing of Small Targets, 2006, pp. 623601-1-623601-9, vol. 6236.

Beyon, Jeffrey Y., et al., "Resolution Study of Wind Parameter Estimates by a Coherent Doppler Lidar System," Proc. of SPIE, Laser Radar Technology and Applications XI, 2006, pp. 621403-1-621403-8, vol. 6214.

Beyon, Jeffrey Y., et al., "Wind Profiling by a Coherent Doppler Lidar System VALIDAR with a Subspace Decomposition Approach," Proc. of SPIE, Signal and Data Processing of Small Targets, 2006, pp. 623605-1-623605-8, vol. 6236.

\* cited by examiner

AIRBORNE WIND PROFILING ALGORITHM FOR DOPPLER WIND LIDAR

CROSS-REFERENCE TO RELATED PATENT APPLICATIONS

This patent application claims the benefit of and priority to U.S. Provisional Patent Application Ser. No. 61/751,291, filed on Jan. 11, 2013, U.S. Provisional Patent Application Ser. No. 61/809,664, filed on Apr. 8, 2013, U.S. Provisional Patent Application Ser. No. 61/820,478, filed on May 7, 2013, and U.S. Provisional Patent Application Ser. No. 61/820,957, filed on May 8, 2013. This application is also related to co-pending U.S. patent application Ser. No. 14/079,965, titled "Airborne Doppler Wind Lidar Post Data Processing Software DAPS-LV," filed on Nov. 14, 2013. The foregoing applications are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Light Detection and Ranging ("LIDAR") is a sensing technology using light pulses (e.g., light from a laser) to determine a distance to objects. Doppler Wind LIDAR systems use light pulses to generate measurements of wind fields in the atmosphere based on the characteristics of the reflected light pulses returned from aerosols suspended in the atmosphere. For example, Doppler Wind LIDAR systems may calculate the distance to aerosols suspended in the atmosphere based on the time difference between transmitting a light pulse or signal and receiving the reflection of that light pulse or signal and/or may calculate the velocity of the aerosols suspended in the atmosphere based on the frequency shift between a transmitted light pulse or signal and a received reflected light pulse or signal. The measurements generated by Doppler wind LIDAR systems may be used to generate wind profiles and other models providing information about the atmosphere.

Airborne Doppler wind LIDAR systems (e.g., Doppler wind LIDAR systems operating from aircraft, such as planes, moving through the atmosphere) present challenges in extracting wind parameters due to many factors such as: data including the movement of instruments (e.g., the instruments to transmit and receive light pulses move with the aircraft and the data is impacted by the instrument movement); wind parameters (e.g., wind speeds) being smaller in magnitude than motion parameters of an aircraft (e.g., speed, roll, pitch, and yaw distortion); and instruments not being perfectly mounted in the aircraft. In order to accurately extract wind parameters from airborne Doppler wind LIDAR system data, these factors must be accounted for in an airborne wind profiling algorithm.

BRIEF SUMMARY OF THE INVENTION

The systems, methods, and devices of the present invention enable airborne Doppler Wind LIDAR system measurements and Inertial Navigation System/Global Positioning System ("INS/GPS") measurements to be combined to estimate wind parameters and compensate for instrument misalignment.

The systems, methods, and devices of the various embodiments provide an Airborne Wind Profiling Algorithm for Doppler Wind LIDAR ("APOLO"), which is a breakthrough in airborne wind profiling for Doppler Wind LIDAR systems. In an embodiment, APOLO may have two components, a wind parameter estimation component and an instrument misalignment compensation component. In another embodiment, APOLO may estimate five instrument installation bias angles such as INS/GPS roll, pitch, and yaw biases, as well as azimuth and elevation biases. In yet another embodiment, APOLO may accurately estimate horizontal wind speed and direction at different altitudes for airborne Doppler Wind LIDAR systems. In an alternative embodiment, APOLO may extract wind parameters from other airborne wind LIDAR systems as well.

In yet another embodiment, APOLO may function by (1) estimating the instrument installation bias angles such as INS/GPS roll, pitch, and yaw, and elevation and azimuth biases; (2) given an airborne Doppler Wind LIDAR data and an INS/GPS data file, distributing the data in range gate bins; (3) estimating the power spectra of the monitoring pulse data in the beginning of each wind LIDAR data; (4) performing DVT ("Data Validity Test") by investigating the peak frequency of the monitoring pulse data; (5) estimating the power spectra and the Doppler shift of each range gate bin data using their periodogram; (6) transforming the wind vector from the Earth coordinate (East-North-Up) into the aircraft coordinate using the INS/GPS data and the estimated instrument installation bias angles; (7) estimating wind parameters in the aircraft coordinate; and (8) transforming the wind parameters back to the Earth coordinate.

In a further embodiment, the wind speed and wind direction may be computed based on two orthogonal line of sight LIDAR returns. In another embodiment, the wind speed and wind direction may be computed based on five line of sight LIDAR returns.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
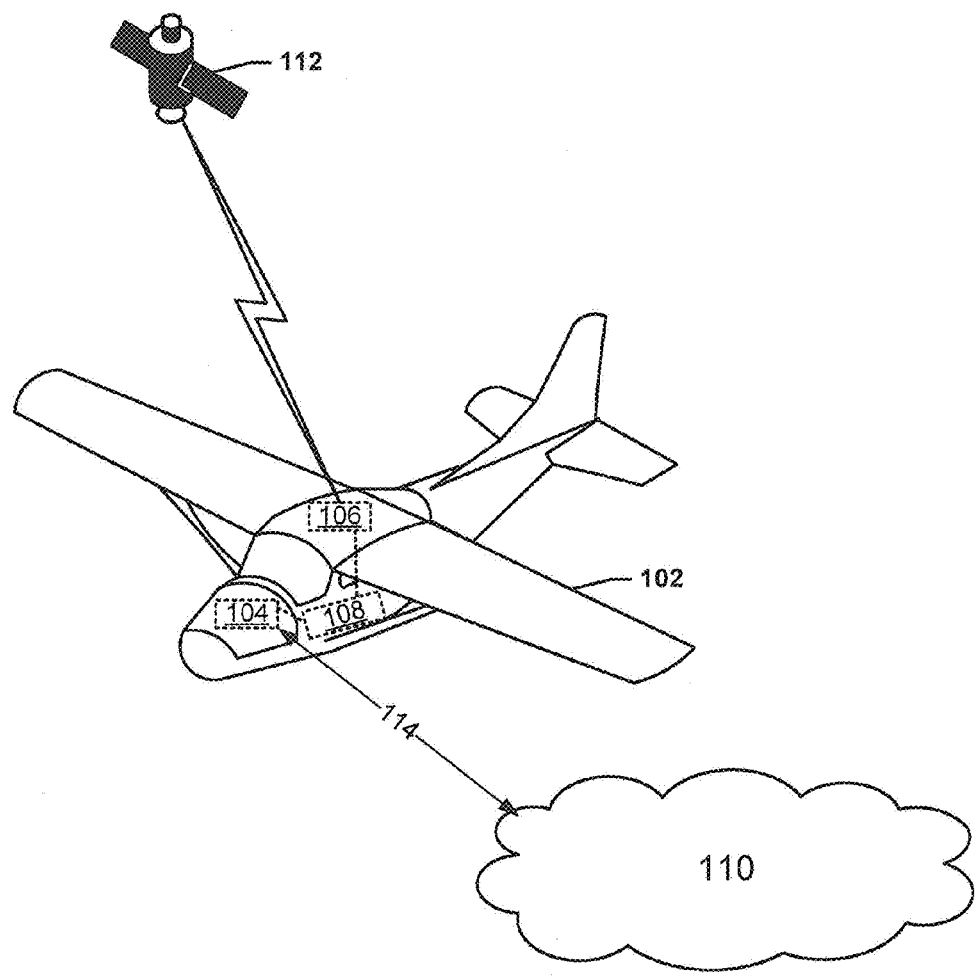
FIG. 1 is system block diagram of an example airborne Doppler Wind LIDAR system suitable for use with the various embodiments.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The systems, methods, and devices of the present invention enable airborne Doppler Wind LIDAR system measurements and INS/GPS measurements to be combined to estimate wind parameters and compensate for instrument misalignment.

The systems, methods, and devices of the various embodiments provide an Airborne Wind Profiling Algorithm for Doppler Wind LIDAR ("APOLO"), which is a breakthrough in airborne wind profiling for Doppler Wind LIDAR systems. In an embodiment, APOLO may have two components, a wind parameter estimation component and an instrument misalignment compensation component. In an embodiment, APOLO may estimate five instrument installation bias angles such as INS/GPS roll, pitch, and yaw biases, as well as azimuth and elevation biases. In an embodiment, APOLO may accurately estimate horizontal wind speed and direction at different altitudes for airborne Doppler Wind LIDAR systems. In an embodiment, APOLO may extract wind parameters from other airborne wind LIDAR systems as well.

In yet another embodiment, APOLO may function by (1) estimating the instrument installation bias angles such as INS/GPS roll, pitch, and yaw, and elevation and azimuth biases; (2) given an airborne Doppler Wind LIDAR data and an INS/GPS data file, distributing the data in range gate bins; (3) estimating the power spectra of the monitoring pulse data in the beginning of each wind LIDAR data; (4) performing DVT ("Data Validity Test") by investigating the peak frequency of the monitoring pulse data; (5) estimating the power spectra and the Doppler shift of each range gate bin data using their periodogram; (6) transforming the wind vector from the Earth coordinate (East-North-Up) into the aircraft coordinate using the INS/GPS data and the estimated instrument installation bias angles; (7) estimating wind parameters in the aircraft coordinate; and (8) transforming the wind parameters back to the Earth coordinate.

In a further embodiment, the wind speed and wind direction may be computed using APOLO based on two line of sight ("LOS") LIDAR returns 90 degrees apart (e.g., a line of sight at −45 and 45 degrees, where 0 degrees is straight ahead of the aircraft). With APOLO, simple vector summing of the two lines of sight may enable estimation of wind parameters. In this manner, wind parameters may be estimated using airborne Wind LIDAR data from two orthogonal directions. The advantage of using only two lines of sight may be that the APOLO is less susceptible to noise, while the vertical wind component may be assumed to be zero. In another embodiment, the wind speed and wind direction may be computed using on a second algorithm based on five line of sight ("LOS") LIDAR returns. The second algorithm may use pseudo-inverse to solve for unknowns (e.g., wind parameters) and may be sensitive to noise due to the pseudo-inverse computations. In this manner, wind parameters may be estimated using airborne Wind LIDAR data from five directions. Whether using two orthogonal lines of sight or five lines of sight, each embodiment algorithm may compensate for adverse effects of different coordinate systems between the aircraft and the Earth. Additionally, both the embodiment two orthogonal line of sight and five line of sight algorithms may process wind LIDAR data in real time or near real time to display instantaneous wind profiles as well as long haul wind trend observations during an airborne mission. Additionally, each embodiment algorithm has the capability of instrument offset compensation, which may be critical for accurate wind parameter estimation. Such instrument offsets stem from a variety of sources such as INS/GPS unit misalignment, LIDAR telescope misalignment, and scanner installation bias. Both the APOLO algorithm and the five line of sight algorithm have a separate routine to estimate offset angles using ground return LIDAR data to compensate their adverse effects to accurate wind parameter estimates. The offset compensation routines for each algorithm may be entirely independent of each other except the basic principle of minimization of mean square errors in a multivariate system.

The various embodiments may address challenges faced in Airborne Doppler wind LIDAR systems by accounting for wind speeds often being far less than aircraft speeds, accounting for wind directions being relative to an aircrafts navigation path, accounting for INS/GPS coordinates being different from aircraft coordinates, accounting for instruments not being mounted perfectly, accounting wind definitions varying by audience, accounting for difficulty in finding a reference wind measurement, and accounting for a lack of a reference algorithm.

FIG. 1 illustrates an example aircraft mounted system suitable for use with the various embodiments. The system may include an airborne Doppler Wind LIDAR system 104, an INS/GPS system 106, and a computing device 108 including a processor mounted in an aircraft 102. The aircraft 102 may be any type aircraft, such as a DC-8, UC-12B, WB-57, Global Hawk Unmanned Airborne System ("UAS"), etc. The Doppler Wind LIDAR system 104 may be any type Doppler Wind LIDAR system, such as a pulsed 2-Micron Coherent Doppler LIDAR system. The Doppler Wind LIDAR system 104 may transmit and receive pulses of light 114 along one or more line of sight and generate Doppler Wind LIDAR data about aerosols 110 in the atmosphere. The INS/GPS system 106 may receive GPS timing signals from GPS satellites 112, along with other aircraft information, and generate INS/GPS data, such as the aircraft 102 Earth coordinate speed in the east, north, and up direction, inertial measurement unit ("IMU") in meters/second, speed, roll, pitch, and heading angles in degrees, latitude, longitude, altitude, etc. The Doppler Wind LIDAR system 104 and the INS/GPS system 106 may be connected to the computing device 108 and may output data files for each line of sight (or look direction) to the computing device 108 which may he received by the computing device's 108 processor. As an example, for each line of sight along which data may be collected by the Doppler Wind LIDAR system 104, a pair of a raw Doppler Wind LIDAR data file and a INS/GPS data file may be output to the computing device's 108 processor. The Doppler Wind LIDAR data file may include N segments of LIDAR return data, where each segment may be 55000 samples long resulting in a total length of 55000*N samples. The INS/GPS data file may also include N repetitions of IMU data, such as VAE, VAN, VAU, IMU speed (equal to $\sqrt{VAE^2+VAN^2+VAU^2}$), roll, pitch, and heading angles in degrees, longitude, latitude, and altitude. VAE, VAN, and VAU may be the aircraft 102 speed in meters per second in the Earth coordinate east, north, and up directions. At each line of sight the IMU data in the INS/GPS data file may be averaged over the N VAEs, VANs, VAUs, rolls, pitches, and heading angles and denoted as aircraft speed east value ($V_{AE}$), an aircraft speed north value ($V_{AN}$), an aircraft speed up value ($V_{AU}$), an aircraft roll value (Roll), an aircraft pitch value (Pitch), and an aircraft heading value (Heading). The longitude and latitude at each line of sight may be the longitude and latitude at the first scanning or first segment. The Doppler Wind LIDAR data file and INS/GPS data file may be created and sent to the processor of the computing device 108 for use in airborne wind profiling.

Figure 2:
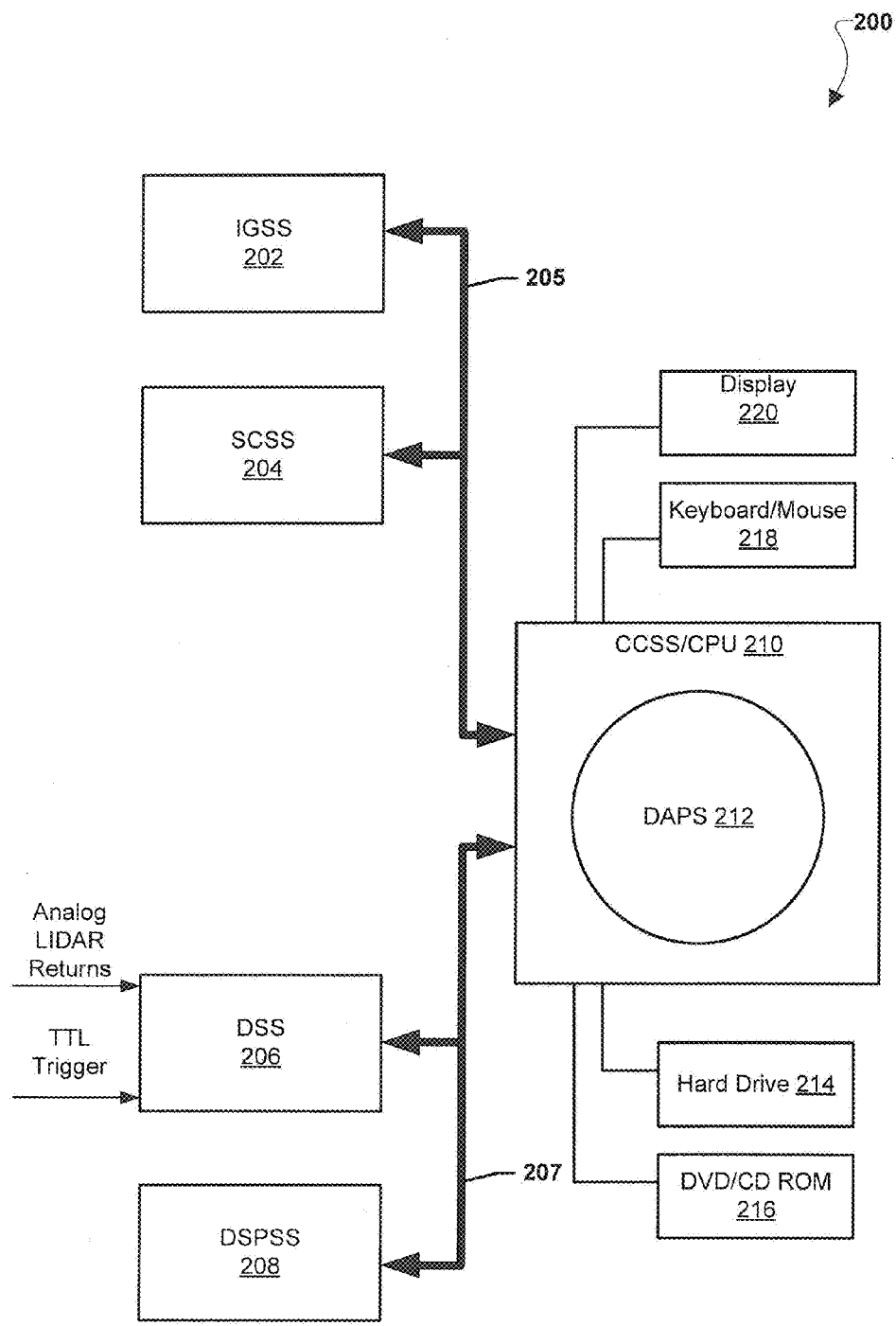
FIG. 2 is a component block diagram of an example data acquisition processing and display system according to an embodiment.

FIG. 2 illustrates a data acquisition processing and display system ("DAPDS") 200 according to an embodiment. The DAPDS 200 may include an INS/GPS subsystem ("IGSS") 202 and scanner subsystem ("SCSS") 204 connected to a processor of a computing device 210, such as core control subsystem ("CCSS") or central processing unit ("CPU") by a bus 205, such as a RS-232 bus. In this manner, the IGSS 202 and/or SCSS 204 may send/receive data to/from the processor of the computing device 210. The DAPDS 200 may also include a digitizer subsystem ("DSS") 206 which may receive analog LIDAR returns and triggers (e.g., transistor-transistor logic ("TTL"), etc.) and a digital signal processing ("DSP") subsystem ("DSPSS") 208. The DSS 206 and DSPSS 208 may be connected to the processor of the computing device 210 by a bus 207, such as a backplane peripheral component interconnect ("PCI") bus. The processor of the computing device 210 may run data acquisition and processing software ("DAPS") 212 to estimate wind parameters by measuring the frequency shift in LIDAR back scatters while providing range information.

The processor of the computing device 210 may execute data acquisition and processing software ("DAPS") 212 causing the processor of the computing device 210 to perform operations to use the two line of sight APOLO algorithm and/or a five line of sight algorithm to process wind LIDAR data and apply instrument offset compensation, for example to process the data in real time or near real time to display instantaneous wind profiles as well as long haul wind trend observations during an airborne mission. The processor of the computing device 210 may be connected to a keyboard/mouse 218 to receive user inputs and may also be connected to a display 220 to display one or more plots of LIDAR data and/or wind parameters. The processor of the computing device 210 may also be connected to a memory 214 (e.g., a hard drive) and DVD/CD ROM 216 enabling the processor of the computing device 210 to read data and store data as needed.

Figure 3:
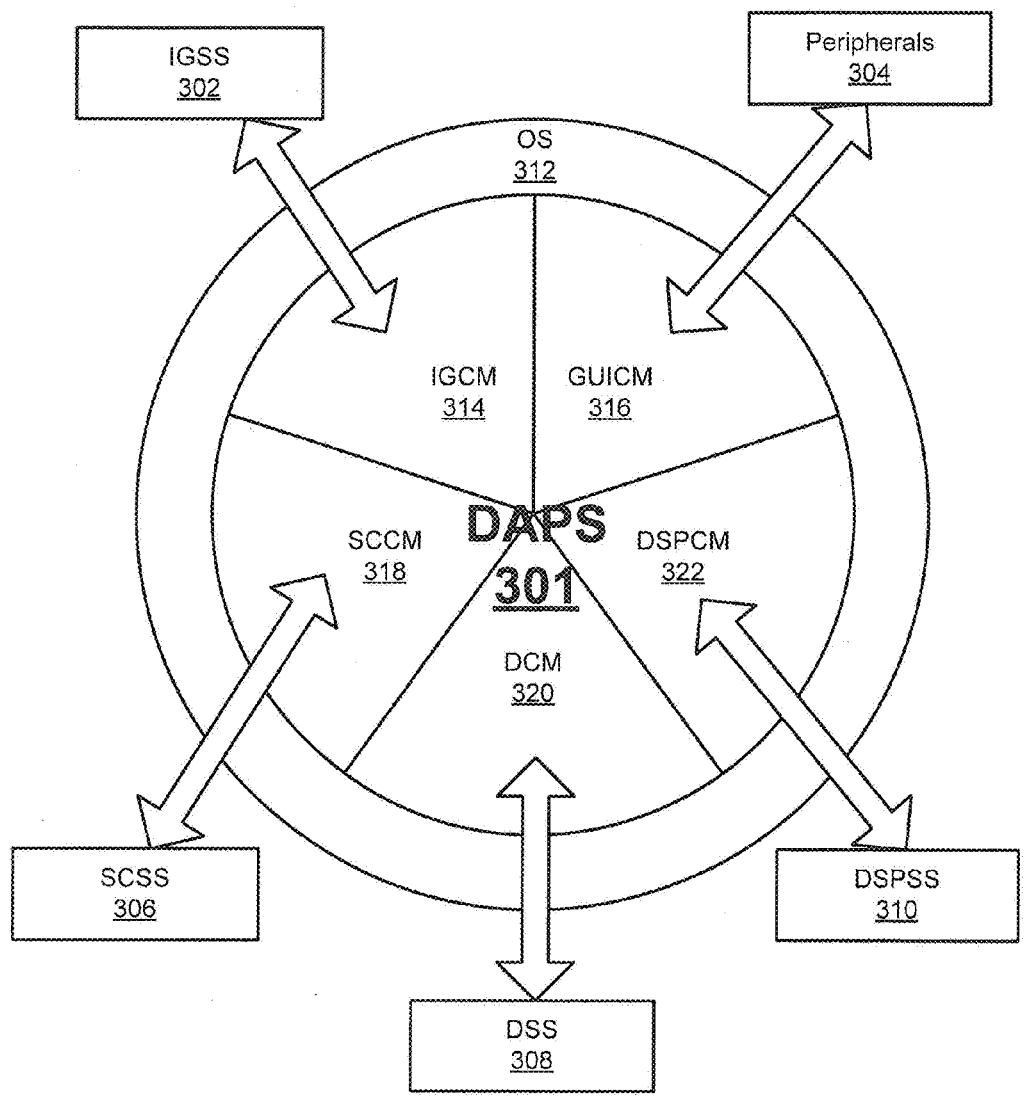
FIG. 3 is a data structure diagram of example modules of data acquisition and processing software according to an embodiment.

FIG. 3 illustrates example modules of data acquisition and processing software ("DAPS") 301 according to an embodiment. The DAPS 301 may run within an operating system ("OS") 312 running on a processor of a computing device. The DAPS 301 may include a INS/GPS control module ("IGCM") 314 which may send/receive data to/from an IGSS 302. The DAPS 301 may include a graphical user interface ("GUI") control module 304 which may send/receive data to/from peripheral devices 304, such as receiving indications of user inputs from a keyboard or mouse and/or generating displays of plots and wind data for rendering on a display. The DAPS 302 may include a DSP control module ("DSPCM") 322 which may control and send/receive data to/from a DSPSS 310 to control a DSP. The DAPS 301 may include a digitizer control module ("DCM") 320 which may send/receive data to/from a DSS 308 to control digitization of LIDAR data. The DAPS 301 may include a scanner control module ("SCCM") 318 which may send/receive data to/from a SCSS 306. The various modules 314, 316, 318, 320, 322 of the DAPS 301 may work in conjunction with one another to cause a processor of a computing device to perform operations to use the two line of sight APOLO algorithm and/or a five line of sight algorithm to process wind LIDAR data with instrument offset compensation, for example to process the data in real time or near real time to display instantaneous wind profiles as well as long haul wind trend observations during an airborne mission.

Figure 4:
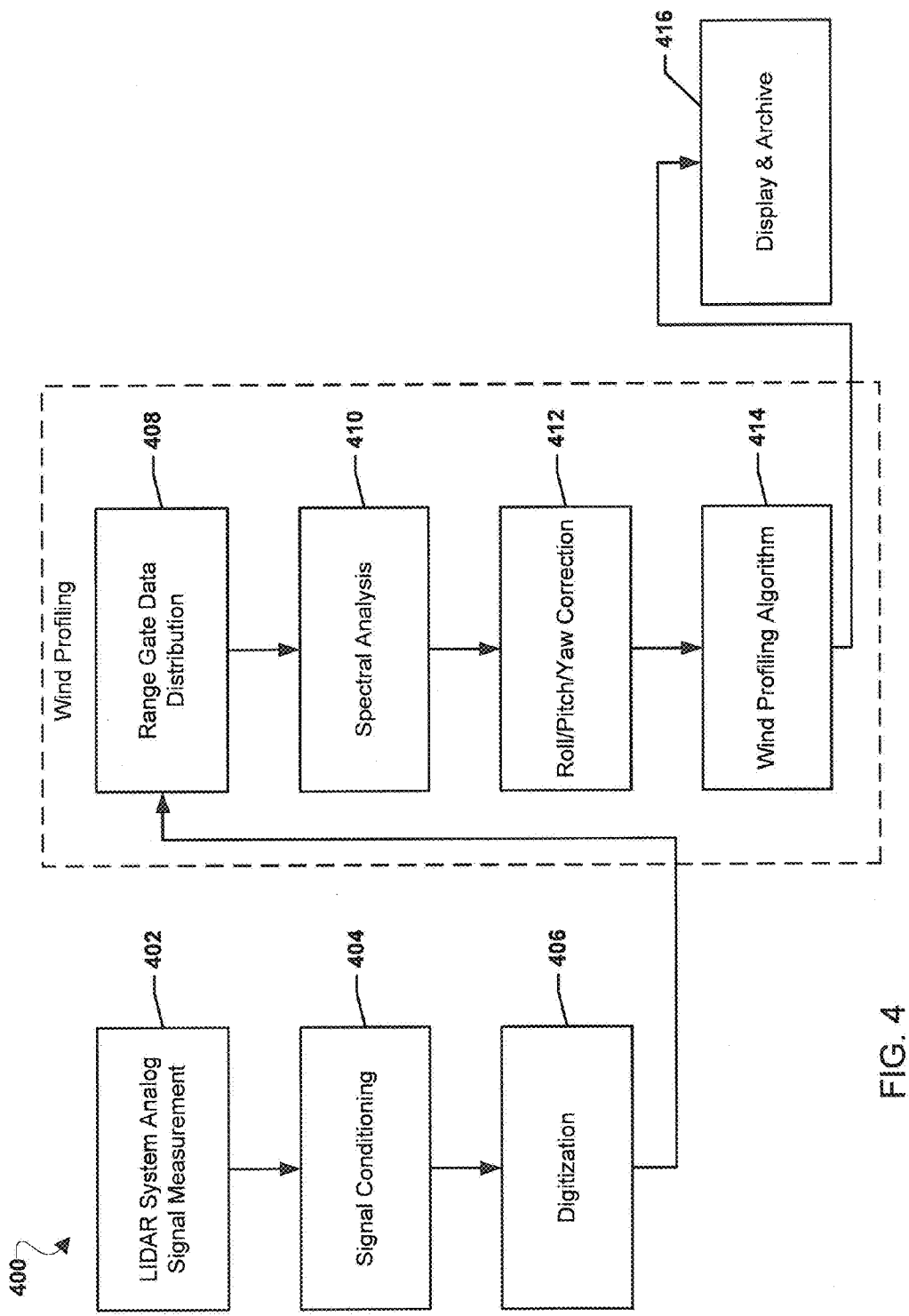
FIG. 4 is a process and data flow diagram illustrating operations performed by an airborne Doppler Wind LIDAR system during airborne wind profiling according to an embodiment.

FIG. 4 illustrates an embodiment method 400 and data flow performed by an airborne Doppler Wind LIDAR system according to an embodiment. In block 402 the LIDAR system may generate an analog signal measurement of LIDAR returns. In block 404 signal conditioning techniques may be applied to the analog LIDAR data. In block 406 the analog LIDAR data may be digitized to generate a digital LIDAR data. In blocks 408, 410, 412, and 414 wind profiling may be performed using the digital LIDAR data. Specifically, in block 408 the digital LIDAR data may be distributed into range gates. In block 410 spectral analysis may be applied, for example to determine the power spectra and Doppler frequencies along the lines or sight. In block 412 roll, pitch, and yaw correction may be applied, for example to compensate for adverse effects of different coordinate systems between the aircraft and the Earth, and in block 414 a wind profiling algorithm, such as APOLO or a five line of sight algorithm, may be applied to generate a wind profile, for example by computing the wind speed and wind direction. In block 416 the wind profile may be displayed and/or archived, for example displayed on a display in an aircraft and/or stored in a memory (e.g., a hard drive) for use in post processing.

FIGS. 5A-5D illustrate an embodiment method 500 for computing wind speed and wind direction from Airborne Wind LIDAR data. In an embodiment, the operations of method 500 may be performed by the processor of a computing device in an aircraft mounted system including an airborne Doppler Wind LIDAR system and an INS/GPS system. In block 502 of FIG. 5A the processor may receive airborne Doppler Wind LIDAR data. The Doppler Wind LIDAR data may include N segments of LIDAR returns for two or more lines of sight (LOS), such as two LOS perpendicular to each other or five LOS spaced evenly over 90 degrees. As an example, each segment may be 55000 samples resulting in a total length for the segments of the LOS being 55000*N. In block 504 the processor may receive INS/GPS data. The INS/GPS data may include N repetitions of aircraft IMU VAE, VAN, VAU, speed, roll, pitch, and heading angles in degrees. VAE, VAN, VAU may be aircraft speed in meters per second in the Earth coordinate east, north, and up directions. At each line of sight the averages of N VAEs, VANs, VAUs, roll, pitch, and heading angles may be denoted as aircraft speed east value ($V_{AE}$), an aircraft speed north value ($V_{AN}$), an aircraft speed up value ($V_{AU}$), an aircraft roll (Roll) value, an aircraft pitch (Pitch) value, and an aircraft heading value (Hdg). The latitude and longitude at each LOS may be the longitude and latitude values at the first of N scanning (i.e., n=0).

In determination block 506 the processor may determine whether offset estimation is on or not. If offset estimation is on (i.e., determination block 506="Yes"), in block 508 the processor may determine roll, pitch, and yaw offset angles based on a ground return data set. For offset estimation, in a manner similar to that discussed below with reference to block 544 of FIG. 5D the processor may find the offset angles in each mth range bin for m=1:M. One $V_A(x, v, z)_{LOS}$ is found, the processor may find $\Delta\alpha$, $\Delta\beta$, $\Delta\theta$, and $\Delta\emptyset$ that minimize the sum of $e_k^2$, where $e_k$=$f_k$ (Doppler shift in Hz in the kth ground return range bin)*L/2−|$V_A(x, y, z)_{LOS}|_k$, and L equals the wavelength in meters, 2.05402E-6 m and k is the index of ground return range bin data sets.

In block 510 the processor may determine the number (D) of LOS in the LIDAR data. In block 512 of FIG. 5B the processor may set a value d equal to zero. In determination block 514 the processor may determine whether the value d is equal to D. In this manner, the processor may loop through various operations of method 500 until data from all lines of sight has been analyzed. If d does not equal D (i.e., determination block 514="No"), in block 516 the processor may determine the number of segments N in the LIDAR data. As an example, the number N may be a number of pulses averaged, such as 20. In block 518 the processor may set a value of n equal to zero. In determination block 520 the processor may determine whether n equals N. In this manner, the processor may loop through various operations of method 500 until data from all segments of the LOS has been analyzed.

Figure 5A:
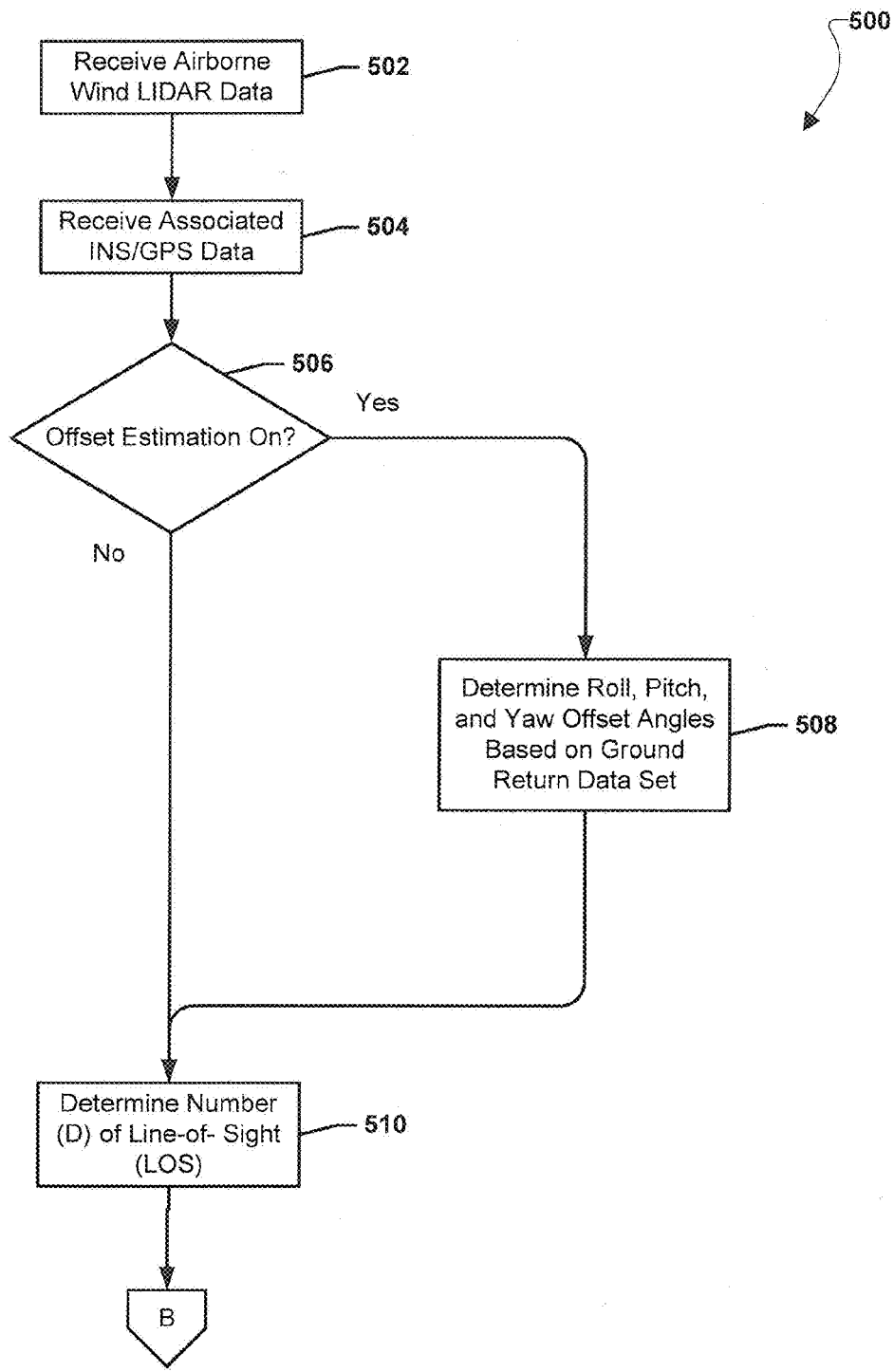
FIGS. 5A-5D are a process flow diagram illustrating an embodiment method for computing wind speed and wind direction from Airborne Wind LIDAR data.
Figure 5B:
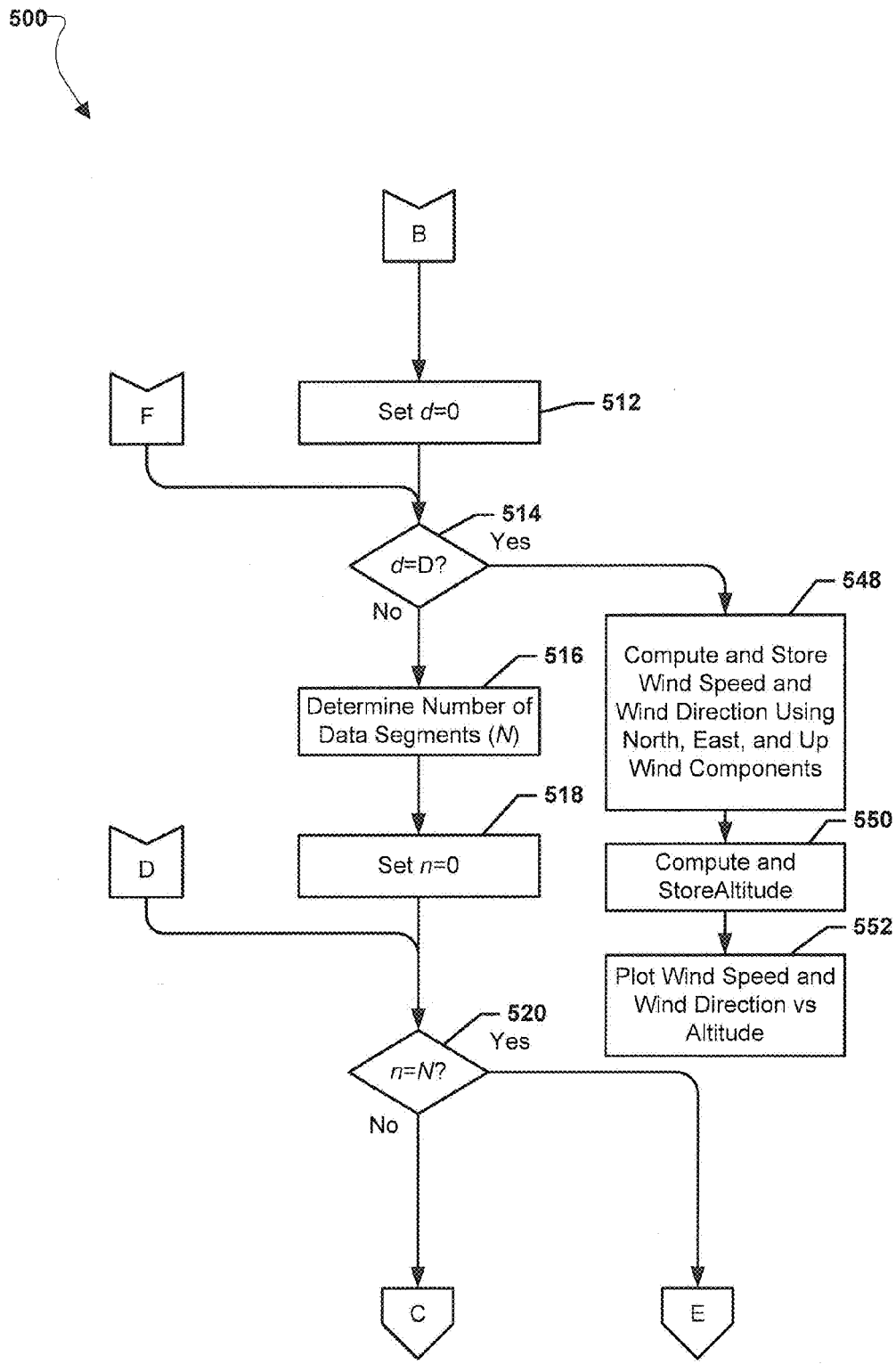
Figure 5C:
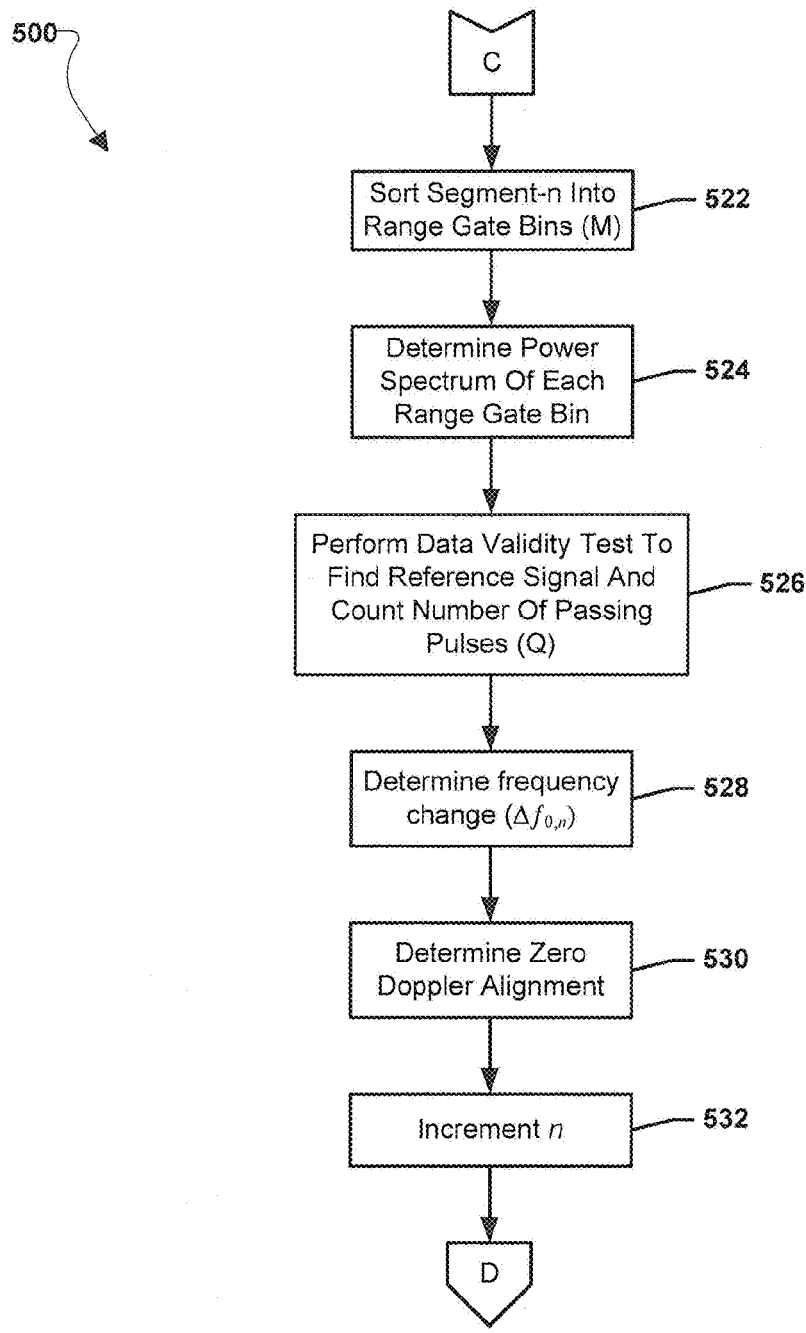

If n does not equal N (i.e., determination block 520="No"), in block 522 of FIG. 5C the processor may sort the nth segment into a number of range gate bins M. As an example, the processor may acquire $s_n(t)$ and divide it into M+1 vectors, $X_{0,n}$, $X_{1,n}$ ... $X_{M,n}$, with an overlap excluding the first vector $X_{0,n}$. ($X_{0,n}$ may not have an overlap with $X_{1,n}$ and may only be used for a data validation test as discussed below). Note that the length of the first vector $X_{0,n}$ may be different from the rest of the vectors, for example, the first vector may be 1024 samples long while the rest have 512 samples. The first vector may include pre-triggering data (1,000 samples for example were used in the Genesis and Rapid Intensification Processes ("GRIP") test mission discussed below) as well. In such a case, the total number of data, such as 55,000, may include the pre-triggering data. In block 524 the processor may determine the power spectra of each range gate bin according to the equation $X_{m,n}$=Power spectrum of $x_{m,n}$, $\forall$m.

In block 526 the processor may perform a data validity test to find a reference signal and count the number of passing pulses (Q). As an example, the data validity test ("DVT") may be to check if ZDmin≤$f_{0,n}$≤ZDmax, where $$f_{0,n} = \max_{f \geq F}[X_{0,n}(f)].$$

Note that maximum power frequency may be estimated above a nominal value F Hertz ("Hz"). ZDmin and ZD max may be the minimum and maximum limits of Doppler frequency, which were 95 MHz and 115 MHz, respectively, during the GRIP test missions discussed below. If true and it is the first case, $f_{0,n}$ will be the reference zero Doppler frequency. If the current $f_{0,n}$ does not pass the DVT, go to the next (n+1)th interation and test it. Assuming the $f_{0,n}$ passes the DVT for the first time at the Kth iteration, where n=K which can be anywhere between 0 and N−1, then $s_K(t)$ becomes the reference signal and $f_{0,K}$ is the reference zero Doppler frequency for all n at the current look direction d. In block 528 the processor may determine the frequency change $\Delta f_{0,n}$ as equal to $f_{0,K}$−$f_{0,n}$, n≥K.

In block 530 the processor may determine the zero Doppler alignment ("ZDA") $\hat{X}_{m,n}(f)$ as equal to $X_{m,n}(f+\Delta f_{0,n})$, for m=1:M. Note that m does not start at 0, meaning the first vector $X_{0,n}$ may be excluded in the data processing since $X_{0,n}$ is used only to estimate $f_{0,n}$. M is the number of range bins. Also, note that the zero Doppler alignment in the airborne system differs from that of ground based wind profiling algorithms which use $X_{m,n}(f-\Delta f_{0,n})$. For example, assume $f_{0,K}$=100 MHz from $x_{0,K}$ in $s_K(t)$ and $f_{0,q}$=98 MHz from $x_{0,q}$ in $s_q(t)$, where K≤q≤N−1, and the LIDAR returned data at n=K, $s_K(t)$, passed the DVT for the first time, and the later pulse return at n=q, $s_q(t)$ also passed the DVT. Then $\Delta f_{0,q}$=$f_{0,K}$−$f_{0,q}$=2 MHz resulting in $\hat{X}_{m,q}(f)$=$X_{m,q}(f+2$ MHz), for m=1:M. This means shifting $X_{m,q}(f)$ by 2 MHz to the left (not the right) to obtain $\hat{X}_{m,q}(f)$. This differs from the ground based wind profiling algorithm where the shift is to the right. In block 532 the processor may increment n.

Figure 5D:
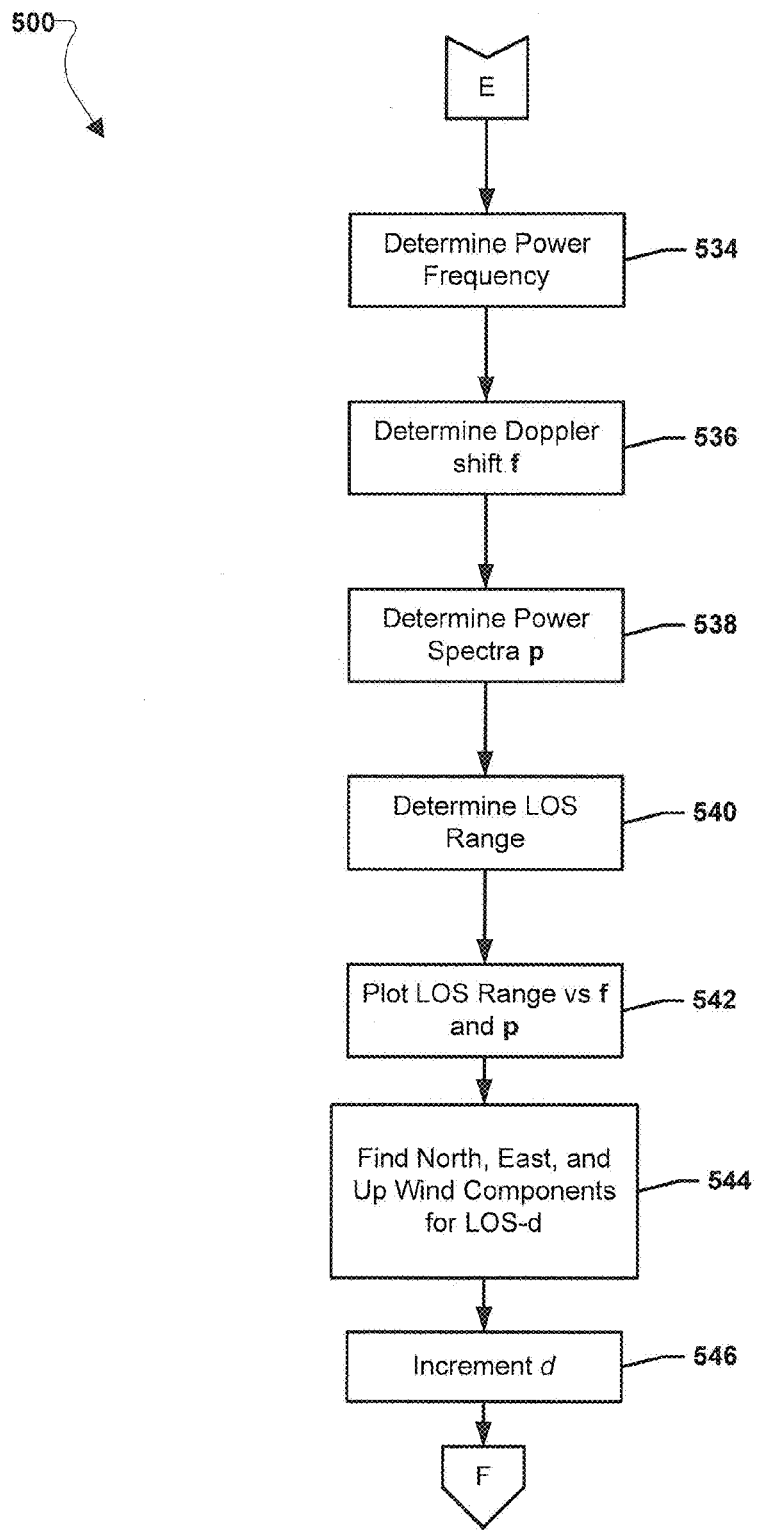

In FIG. 5B, when n equals N (i.e., determination block 520="Yes"), in FIG. 5D bock 534 the processor may determine the power frequency for each of the data segment as a value Y equal to $\{Y_1 \ldots Y_M\}$ wherein $$Y_m(f) = \frac{1}{Q}\sum_{n=0}^{Q-1} \hat{X}_{m,n}(f), m = 1:M.$$

Q is the number of pulse returns having passed the DVT (assuming Q consecutive raw data arrays have passed the DVT). In block 536 the processor may determine the Doppler shift f as a value equal to $\{f_1 \ldots f_M\}$ wherein $$f_m = f_{0,K} + \max_{f \geq F}[Y_m(f)] - 100 \text{ MHz}, m = 1:M.$$

Note that the maximum power frequency is estimated above a nominal value F Hz and includes a sign change and 100 MHz term when compared with the ground based wind profiling algorithm $$f_m = f_{0,K} - \max_{f \geq F}[Y_m(f)].$$

The 100 MHz term may be of a different value for different LIDAR instrument designs. In block 538 the processor may determine the power spectra p as a value equal to $\{p_1 \ldots p_M\}$ wherein $p_m = \max[Y_m(f)]$, $f \geq F$, and m=1:M.

In block 540 the processor may determine the LOS range as a value equal to Bin Range [meter]*(1−Overlap Sample Count/Bin Sample Count)*m+Bin Range [meter]*0.5+ r*c*0.5/ $F_s$ where m=0:M−1, Overlap Sample Count is the number of samples in the overlap between adjacent range bins, r is the index of the first sample in $x_{1,n}$, c is the speed of light in meters per second, $F_s$ is the sample frequency in Hz, and Bin Range[meter]=Bin Sample Count*c*0.5/$F_s$. (The distance between each sample is c*0.5/$F_s$.) Note r in the last term must take into consideration the length of pre-triggering data. For example, if the first 1024 samples were used for the DVT and the length of the pre-triggering data was 1000, r would be 24 (i.e., 1024−1000) instead of 1024. Note that the index begins at zero. If the length of pre-trigger was zero (i.e., no pre-triggering data), then r would be 1024. The last term r*c*0.5/$F_s$ is added to apply the offset caused by excluding the first bin data less the pre-triggering data in data processing. The second term Bin Range [meter]*0.5 is added in order to go by the center of each bin range rather than the beginning or the end. Since $x_{0,n}$ is used only for the DVT, the second bin data $x_{1,n}$ must not include samples from $x_{0,n}$. Also note that the length of the first and the second bin data will likely be different such as 1024 for the first bin and 500 or 512 for the rest. Therefore, the data index r of the first sample in the second bin $x_{1,n}$ must not be one of the indices of the data in $x_{0,n}$. Again, the value of r must be adjusted if pre-trigger data are used for the DVT. In block 542 the processor may plot the LOS range vs f and p (i.e., the line of sight range versus the Doppler Shift and Power spectra). The LOS range may be zero at the aircraft and increases as the LIDAR beam travels away from the aircraft.

In block 544 the processor may determine speed east ($V_{WE}$), speed north ($V_{WN}$), and speed up ($V_{WU}$) wind components for each line of sight (d) as vectors defined by:

$$v_W(N, E, U)_m^{(d)} = \begin{bmatrix} V_{WN,m}^{(d)} \\ V_{WE,m}^{(d)} \\ V_{WU,m}^{(d)} \end{bmatrix}$$

Figure 6A:
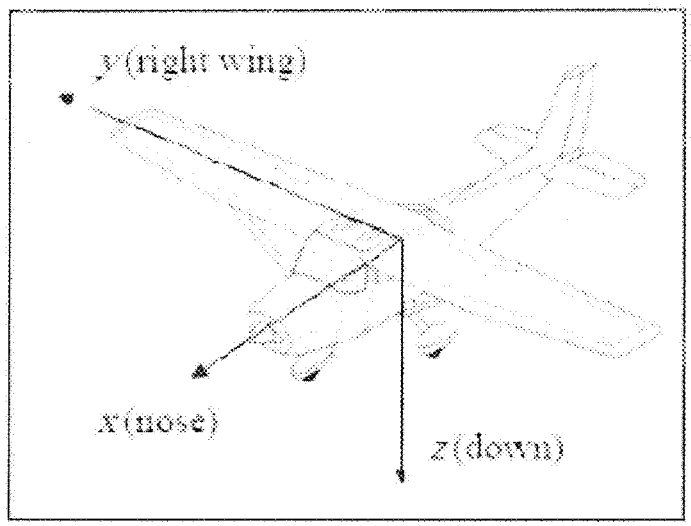
FIGS. 6A-6D illustrate various relationships between various aircraft and wind components, such as speed, heading, pitch, roll, yaw, and direction and aircraft and Earth coordinates.
Figure 6B:
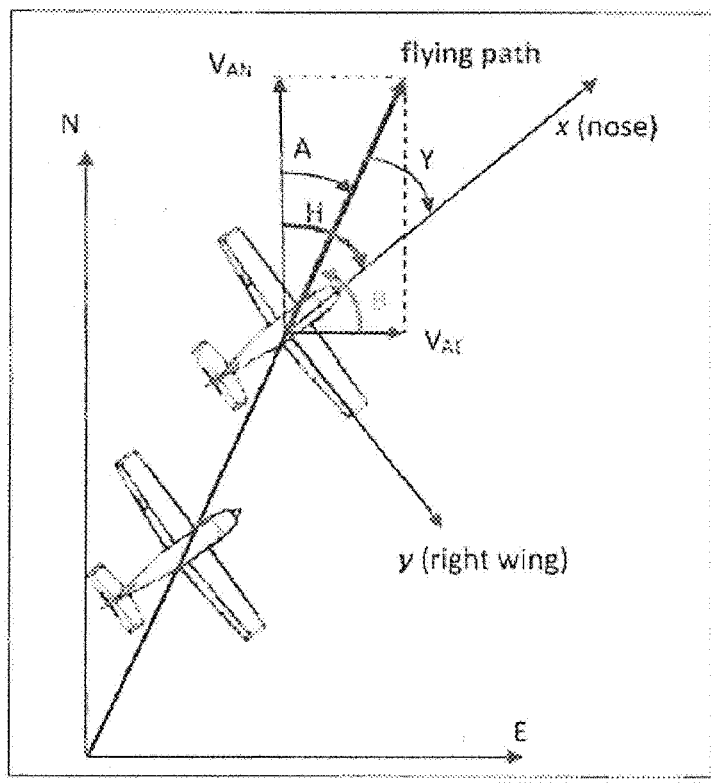

The wind components speed east ($V_{WE}$), speed north ($V_{WN}$), and speed up ($V_{WU}$) are determined by converting tan $$-1\left(\frac{V_{AN}}{V_{AE}}\right)$$

to an angle from N and determining an aircraft yaw (Yaw) value as the aircraft heading value minus the angle from N. (An illustration of such relationships is illustrated in FIG. 6B.) In each mth range bin the following may be then be computed for m=1:M. First $\hat{v}_A(N,E,U)$ may be defined as:

$$\hat{v}_A(N, E, U) = \begin{bmatrix} \hat{v}_{AN} \\ \hat{v}_{AE} \\ \hat{v}_{AU} \end{bmatrix} = \begin{bmatrix} \sqrt{V_{AE}^2 + V_{AN}^2} \\ 0 \\ V_{AU} \end{bmatrix}$$

Note that $\hat{v}_{AN}$, $\hat{v}_{AE}$, and $\hat{v}_{AU}$ may be on a "flat" plane since R(Roll), P(Pitch), and Y(Yaw) matrices have not been applied yet. Also, note that $\hat{v}_{AN}$ is now aligned with the nose of the aircraft. Second, $V_A(N, E, U)$ may be found as:

$$V_A(x, y, z) = \begin{bmatrix} V_{Ax} \\ V_{Ay} \\ V_{Az} \end{bmatrix} = R(\alpha + \Delta\alpha)P(\beta + \Delta\beta)Y(\gamma + \Delta\gamma)\hat{V}_A(N, E, -U) =$$

$$R(\alpha + \Delta\alpha)P(\beta + \Delta\beta)Y(\gamma + \Delta\gamma) \begin{bmatrix} \sqrt{V_{AE}^2 + V_{AN}^2} \\ 0 \\ -V_{AU} \end{bmatrix},$$

where $$R(\alpha) = \begin{bmatrix} 1 & 0 & 0 \\ 0 & \cos\alpha & \sin\alpha \\ 0 & -\sin\alpha & \cos\alpha \end{bmatrix},$$

$$P(\beta) = \begin{bmatrix} \cos\beta & 0 & -\sin\beta \\ 0 & 1 & 0 \\ \sin\beta & 0 & \cos\beta \end{bmatrix}, Y(\gamma) = \begin{bmatrix} \cos\gamma & \sin\gamma & 0 \\ -\sin\gamma & \cos\gamma & 0 \\ 0 & 0 & 1 \end{bmatrix}.$$

Figure 6C:
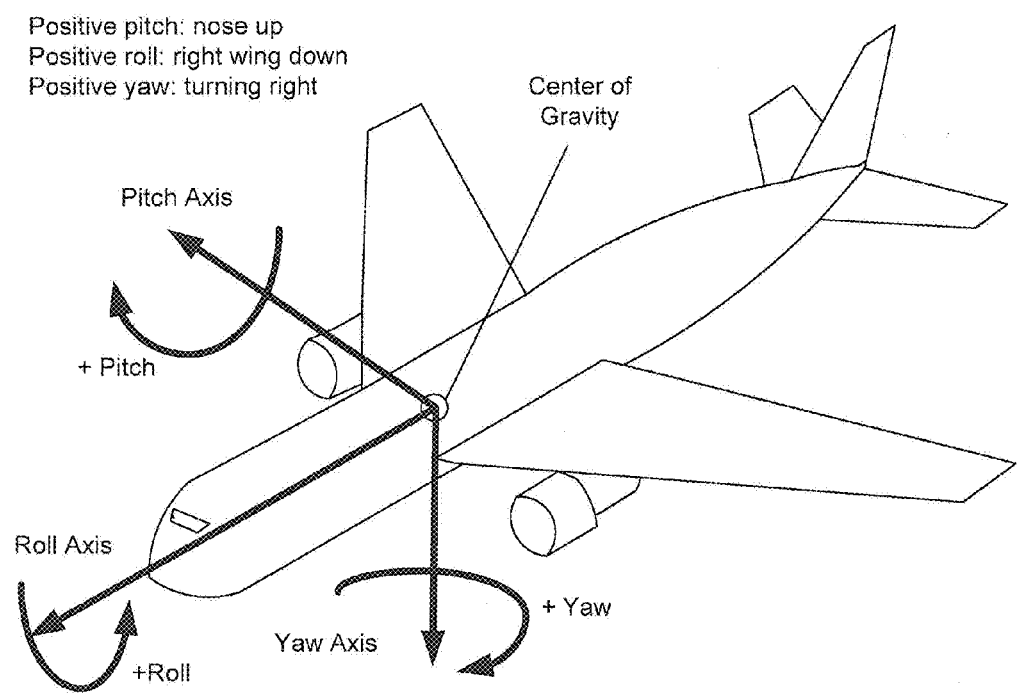

These matrices rotate the axes of the aircraft while the vector remains in the same positions. $\Delta\alpha$, $\Delta\beta$, and $\Delta\gamma$ are the roll, pitch, and yaw offset values that need to be pre-calculated. Now x, y, and z axes (and the aircraft) are crooked since roll, pitch, and yaw have been applied. The vector $\hat{v}_A(N, E, -U)$ remains in the same position, but the aircraft axes (x, y, and z, illustrated for general reference to an aircraft in FIG. 6A and FIG. 6C illustrates the relationships of pitch, roll, and yaw to aircraft orientation) have been rotated. The values $V_{Ax}$, $V_{Ay}$, and $V_{Az}$ are in reference to the new (crooked) x, y, and z coordinates. Third, $V_A(x, y, z)_{LOS}$ may be found which is $V_A(x, y, z)$ along the LOS by projecting $V_A(x, y, z)$ onto the unit vector $u_{\theta,\phi}(x, y, z)$ along the LOS($\theta+\Delta\theta$, $\phi+\Delta\phi$), where $\theta=60°−0.12°$(offset)=59.88° (Elevation: x to z) and $\phi=−45°$, −22.5°, 0°, 22.5°, 45° (d=0:4) (Azimuth: x to y) $\Delta\theta$ and $\Delta\phi$ are the elevation and the azimuth offset relative to the aircraft body. $V_A(x, y, z)_{LOS}=(v_A \cdot u_{\theta,\phi})u_{\theta,\phi}$ where · indicates inner product, and $$u_{\theta,\phi}(x, y, z) = u_{\theta,\phi} = \begin{bmatrix} \cos(\theta + \Delta\theta)\cos(\phi + \Delta\phi) \\ \cos(\theta + \Delta\theta)\sin(\phi + \Delta\phi) \\ \sin(\phi + \Delta\phi) \end{bmatrix} = LOS \text{ unit vector.}$$

Fourth, the wind magnitude $|V_W(x, y, z)|$ along the LOS($\theta$, $\phi$) may be found such that: $|V_W(x, y, z)_{LOS}|=|V_W(x, y, z)+V_A(x, y, z)|$ along the LOS$-|V_A(x, y, z)_{LOS}|=f_m$ (Doppler shift in Hz in the mth range bib)*L/2$-|V_A(x, y, z)_{LOS}|$, where L equals the wavelength in meters, 2.05402E−6 m. Fifth, the $|V_W(x,y,z)_{xyplane}|=|V_W(x,y,z)|$ in the xy plane of the aircraft (which is not level) may be found. This is not the projection onto the xy plane since the value before being projected is desired, which is larger than $|V_W(x, y, z)|$. Thus, $|V_W(x, y, z)_{xy\,plane}|=|V_W(x, y, z)|$ along the LOS($\theta$, $\phi$) discussed above in the fourth step $$* \frac{1}{\cos(\theta + \Delta\theta)} = |V_W(x, y, z)_{LOS}| \times \frac{1}{\cos(\theta + \Delta\theta)}.$$

Sixth, $|V_W(x, y, z)_{xy\,plane}|$ may be decomposed into its components in the x, y, and z directions to construct the wind vector $V_W(x, y, z)$. Assuming the z component is zero (i.e., that there is no vertical wind component at the aircraft in the crooked position), $$V_W(x, y, z) = \begin{bmatrix} V_{Wx} \\ V_{Wy} \\ V_{Wz} \end{bmatrix} = \begin{bmatrix} |V_W(x, y, z)_{xy\,plane}| \times \cos(\phi + \Delta\phi) \\ |V_W(x, y, z)_{xy\,plane}| \times \sin(\phi + \Delta\phi) \\ 0 \end{bmatrix}.$$

Seventh, $$V_W(N, E, U) = \begin{bmatrix} V_{WN} \\ V_{WE} \\ V_{WU} \end{bmatrix}$$

may be found from $V_W(x, y, z)$ by computing $$\hat{V}_W(N, E, -U) = \begin{bmatrix} \hat{V}_{WN} \\ \hat{V}_{WE} \\ \hat{V}_{WU} \end{bmatrix} = [R(\alpha + \Delta\alpha)P(\beta + \Delta\beta)Y(\gamma + \Delta\gamma)]^{-1} V_W(x, y, z).$$

Figure 6D:
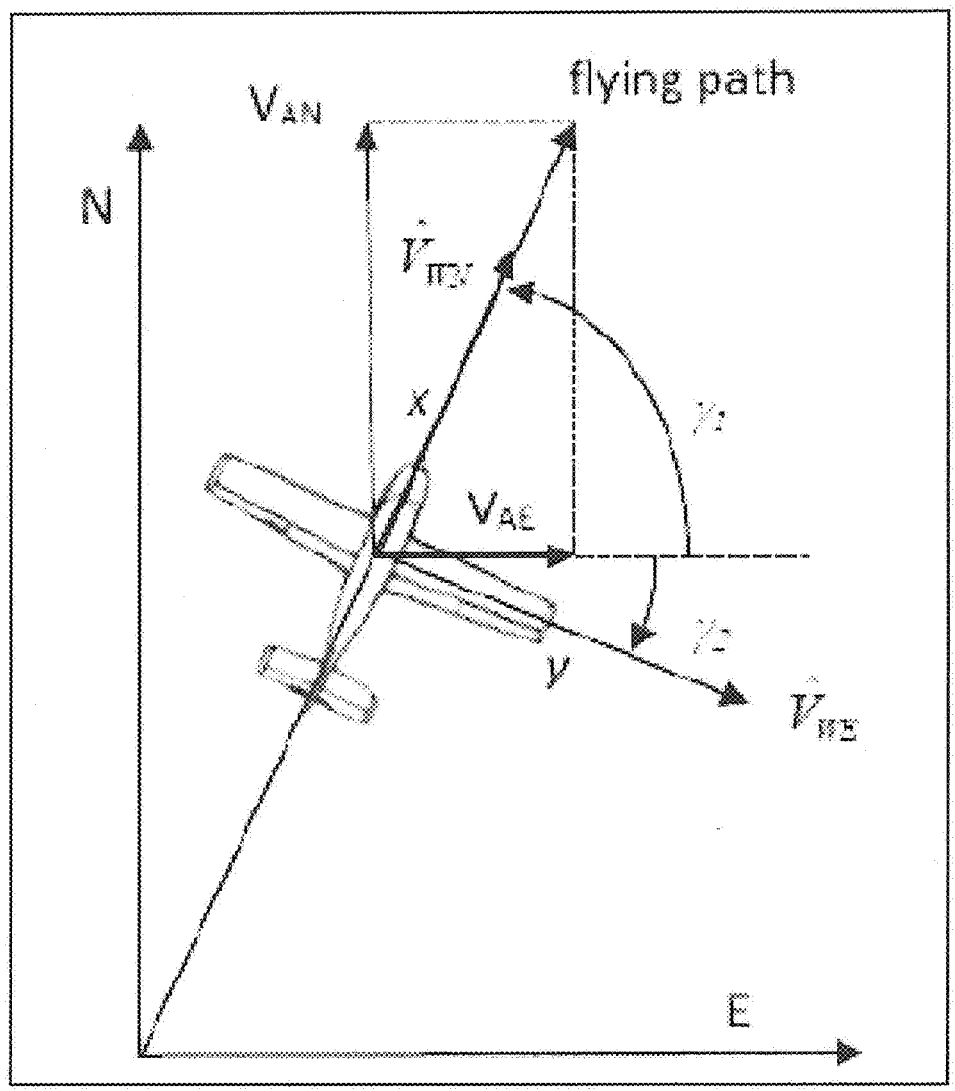

Here, $\hat{V}_{WN}$, $\hat{V}_{WE}$, and $\hat{V}_{WU}$ are back on a "flat" or leveled xy plane of the aircraft without roll, pitch, or yaw, and the x axis (nose of the aircraft) aligns with the direction of $\hat{V}_{WN}$ as illustrated in FIG. 6D. $\gamma_1$ may equal tan $$-1\left(\frac{V_{AN}}{V_{AE}}\right)$$

and $\gamma_2$ may equal $\gamma_2 = \gamma_1 - 90°$. Then, $V_W(N, E, U)$ (or $v_W(N, E, U)_m^{(d)}$ in the mth range bin at the dth LOS may be found by:

$$V_W(N, E, U) = \begin{bmatrix} V_{WN} \\ V_{WE} \\ V_{WU} \end{bmatrix} = \begin{bmatrix} \hat{V}_{WN}\sin\gamma_1 + \hat{V}_{WE}\sin\gamma_2 \\ \hat{V}_{WN}\cos\gamma_1 + \hat{V}_{WE}\cos\gamma_2 \\ -(-\hat{V}_{WU}) \end{bmatrix} :=$$

$$v_W(N, E, U)_m^{(d)} = \begin{bmatrix} V_{WN,m}^{(d)} \\ V_{WE,m}^{(d)} \\ V_{WU,m}^{(d)} \end{bmatrix}.$$

In block 546 the processor may increment d. If d equals D (i.e., determination block 514 in FIG. 5B="Yes"), in block 548 the processor may compute and store wind speed and wind direction using the north, east and up wind components. In an embodiment, the processor may apply the APOLO to compute the wind components using two lines of sight perpendicular to each other. In another embodiment, the processor may apply a five line of sight based algorithm that uses five lines of sight equally spaced over a 90 degree arc to compute the wind speed and the wind direction using pseudo-inverse functions.

The following illustrates an embodiment method for finding wind speed and wind direction using the APOLO. In each range bin (m), the north, east, and up wind components may be found using $v_W(N, E, U)_m^{(d)}$ at the first and the fifth LOSs (e.g., d=1 and 5) as follows:

$$V_W(N, E, U)_m = \begin{bmatrix} V_{WN,m} \\ V_{WE,m} \\ V_{WU,m} \end{bmatrix} =$$

$$v_W(N, E, U)_m^{(1)} + v_W(N, E, U)_m^{(5)} = \begin{bmatrix} V_{WN,m}^{(1)} \\ V_{WE,m}^{(1)} \\ V_{WU,m}^{(1)} \end{bmatrix} + \begin{bmatrix} V_{WN,m}^{(5)} \\ V_{WE,m}^{(5)} \\ V_{WU,m}^{(5)} \end{bmatrix}, m = 1:M.$$

Then, the horizontal wind speed ("HWS") in the mth range bin may be obtained according to:

$$HWS_m = \sqrt{V_{WN,m}^2 + V_{WE,m}^2} = \sqrt{(V_{WN,m}^{(1)} + V_{WN,m}^{(5)})^2 + (V_{WE,m}^{(1)} + V_{WE,m}^{(5)})^2},$$

$$m = 1:M$$

To compute the horizontal wind direction ("HWD"), first $\delta_m$ may be computed as follows:

$$\delta_m = \tan^{-1}\left(\frac{V_{WN,m}^{(1)} + V_{WN,m}^{(5)}}{V_{WE,m}^{(1)} + V_{WE,m}^{(5)}}\right) = \tan^{-1}\left(\frac{V_{WN,m}}{V_{WE,m}}\right), m = 1:M.$$

Not that $\delta_m$ is measured counter-clockwise as positive starting positive east (positive east=0°, positive north=90°, negative east=180°, negative north=270°, etc.). The mathematical HWD in the mth range bin is determined as follows, if $\delta_m<0$, $(HWD_m)_{math}=360°+\delta_m$, else $(HDW_m)_{math}=\delta_m$, where m=1:M. The meteorological HWD in the mth range bin is determined as follows, if 90°−$(HWD_m)_{math}<0$, $HWD_m=360°+90°-(HWD_m)_{math}$, else $HWD_m=90°-(HWD_m)_{math}$, where m=1:M. Or simply $HWD_m=\text{mod}(90°-(HWD_m)_{math},360°)$ where mod (x,y)=x−y*floor(x/y)=remainder of x/y.

In block 550 altitude may be computed and stored. As an example altitude may be computed using $\theta=60°-0.12°$(offset)=59.88°. Altitude may equal GPS aircraft altitude [meters]−LOS Range [meter]*cos(90°−$\theta$) which may equal Altitude [meter]−LOS Range [meter]*cos(30.12°). LOS range may have been previously calculated as discussed above, and an assumption that there is zero roll, pitch, and yaw angles may be made, otherwise LOS range may not be converted uniformly into altitudes. In block 552 the processor may plot and store wind speed and wind direction versus altitude, for example plotting HWS vs Altitude and HWD vs altitude on one or more displays.

Example Results of Wind Profiling Using the Various Embodiments

The various embodiments have been tested in flights using a pulsed 2-micron coherent Doppler LIDAR system and a data acquisition, processing, and display system ("DAPDS") which estimates wind parameters by measuring the frequency shift in LIDAR back scatters while providing range information. A test system flew during the GRIP hurricane campaign on a DC-8, which flew out of Fort Lauderdale, Fla. The total flight time was approximately 130 hours. The goal was to test the airborne wind profiling capabilities of the system. A second flight demonstration and a third flight demonstration on a UC-12B were also conducted. Flight tests on the UC-12B centered on evaluating the installation of the system into a smaller aircraft and in the high vibration environment associated with turboprop engines. The system was operated in 22 and 25 hours of flights on the UC-12B, respectively. The following discussion of FIGS. 7-15 discuss example results gathered in the various test flights using the various embodiments.

Figure 7:
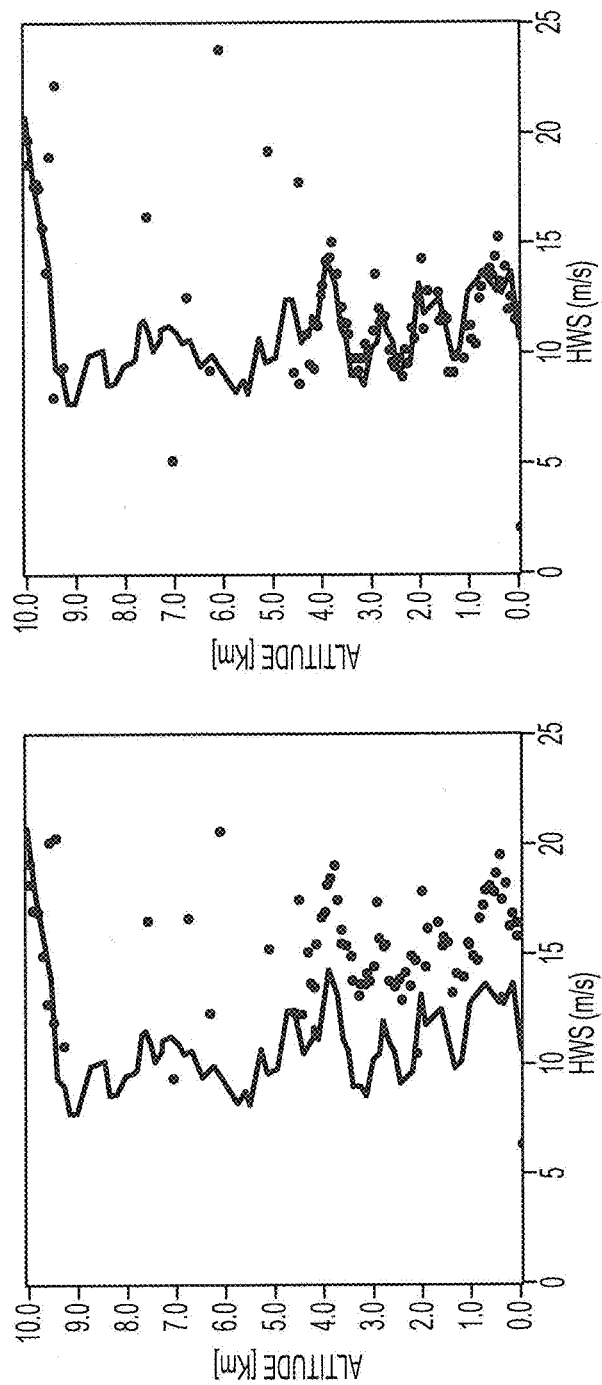
FIG. 7 illustrates a comparison between graphs of APOLO wind speed data and dropsonde wind speed data before and after applying offset compensation.
Figure 8:
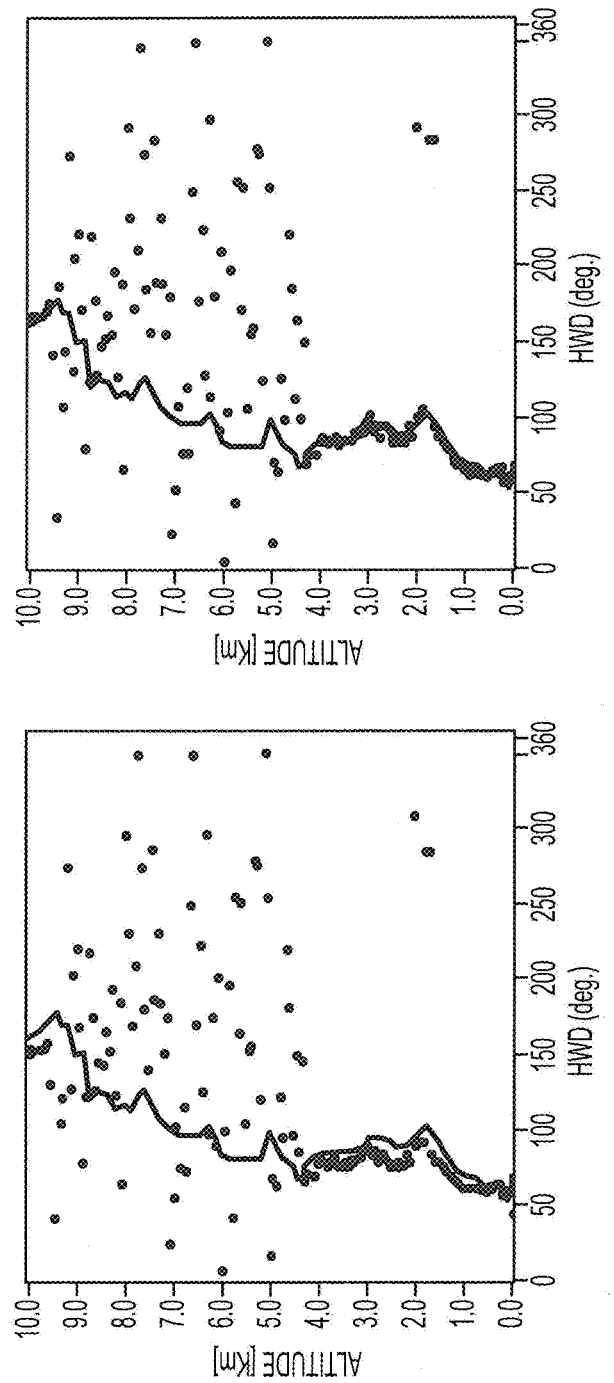
FIG. 8 illustrates a comparison between graphs of APOLO wind direction data and dropsonde wind direction data before and after applying offset compensation.
Figure 9:
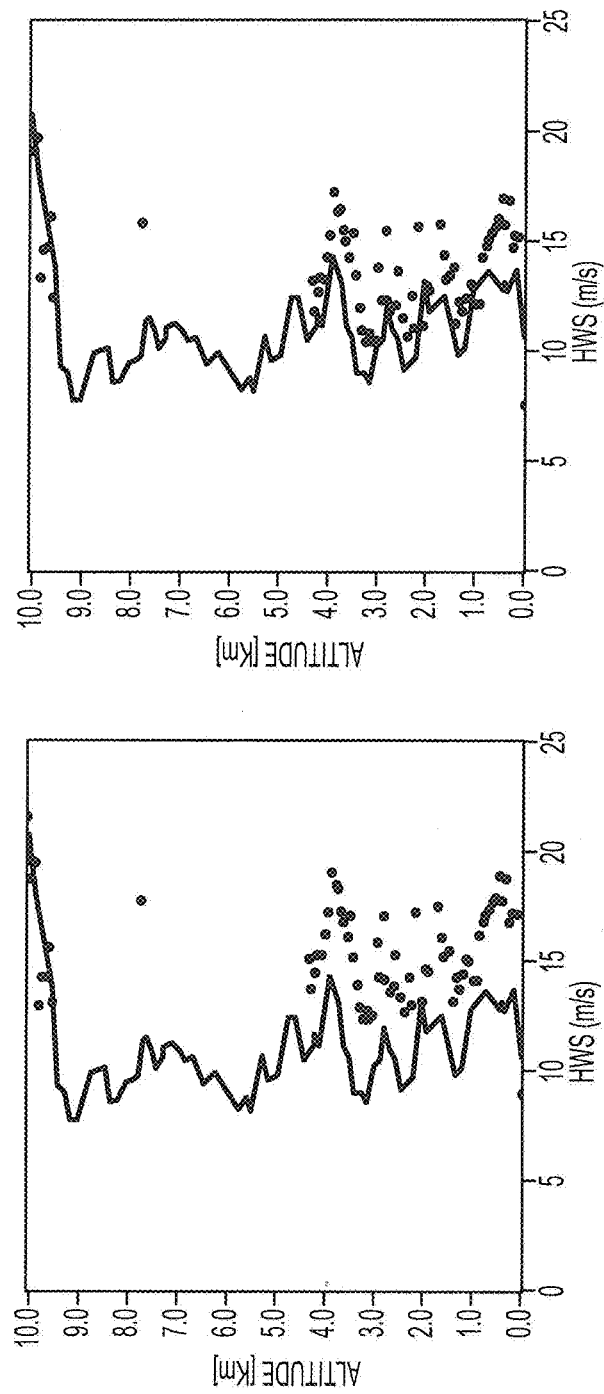
FIG. 9 illustrates a comparison between graphs of 5 LOS based wind speed data and dropsonde wind speed data using different offset estimates.
Figure 10:
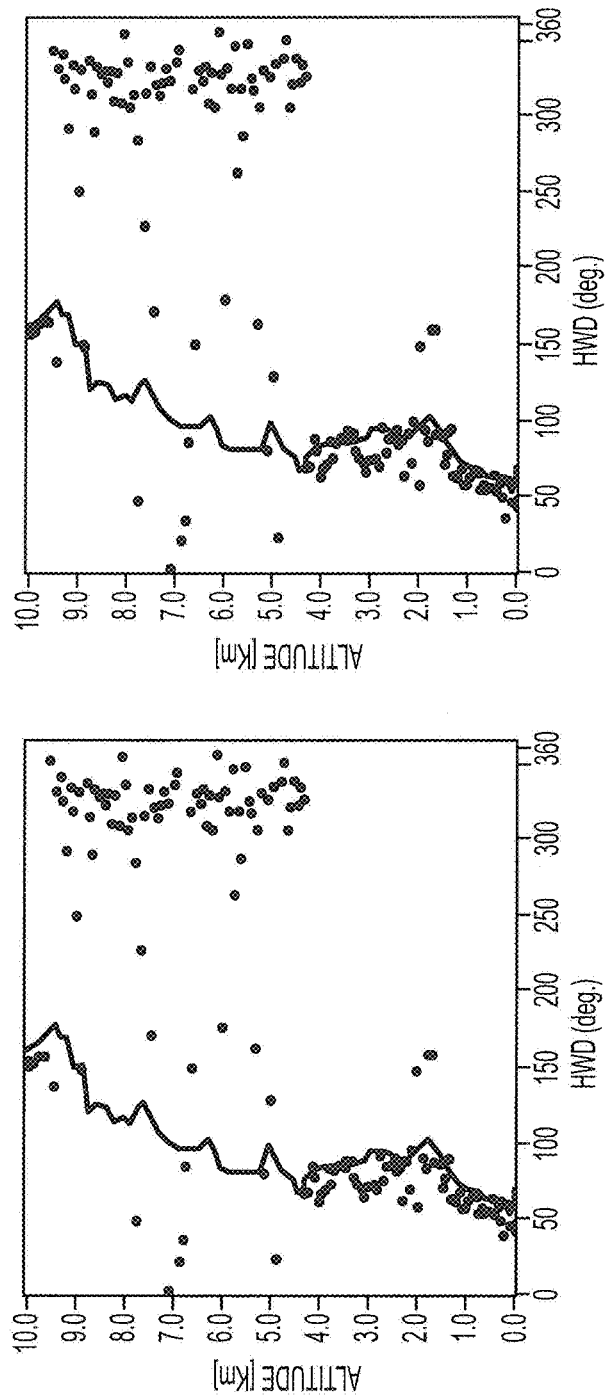
FIG. 10 illustrates a comparison between graphs of 5 LOS based wind direction data and dropsonde wind direction data using different offset estimates.

FIG. 7 shows the result of offset compensation in horizontal wind speed ("HWS") from APOLO on a DC8 while it was at 10,608 meters in altitude before (on the left) and after (on the right) applying offset compensation. The APOLO based estimates are shown as the circles in the graphs. A total of 512 samples were used to represent wind at each altitude, and a 4,096-point Fast Fourier Transform ("FFT") was used to process each set of 512 samples using zero padding. It clearly shows the effectiveness of offset compensation with APOLO. The APOLO estimates near 4.5-9 km in altitude are erroneous due to low received signal backscatter associated with atmospheric conditions of low aerosol content. The solid line is the dropsonde measurement only for a reference purpose, and not to imply which measurements are more accurate (the two sensors measure different volumes over different time scales). The good agreement on the right plot means that the wind was slowly varying over the dropsonde fall time and over the distance of DC-8 movement for the LIDAR measurement time. This agreement is not guaranteed in a general wind field. When it does fortunately occur, it permits comparison of processing algorithms. FIG. 8 shows the result of offset compensation in horizontal wind direction (HWD) from APOLO. The data are the same as FIG. 7. The adverse effects of a low Signal-to-Noise-Ratio (SNR) are clear near 4.5-9 km in altitude. FIG. 9 shows the result of offset compensation in horizontal wind speed ("HWS") from the five line of sight algorithm before (on the left) and after (on the right) applying offset compensation. The five line of sight algorithm based estimates are shown as the circles in the graphs. A total of 512 samples were used to represent wind at each altitude, and a 4,096-point Fast Fourier Transform ("FFT") was used to process each set. The solid line shows dropsonde measurements for reference purposes. FIG. 10 shows the result of offset compensation in horizontal wind direction (HWD) from the five line of sight algorithm. The data are the same as FIG. 9.

Figure 11:
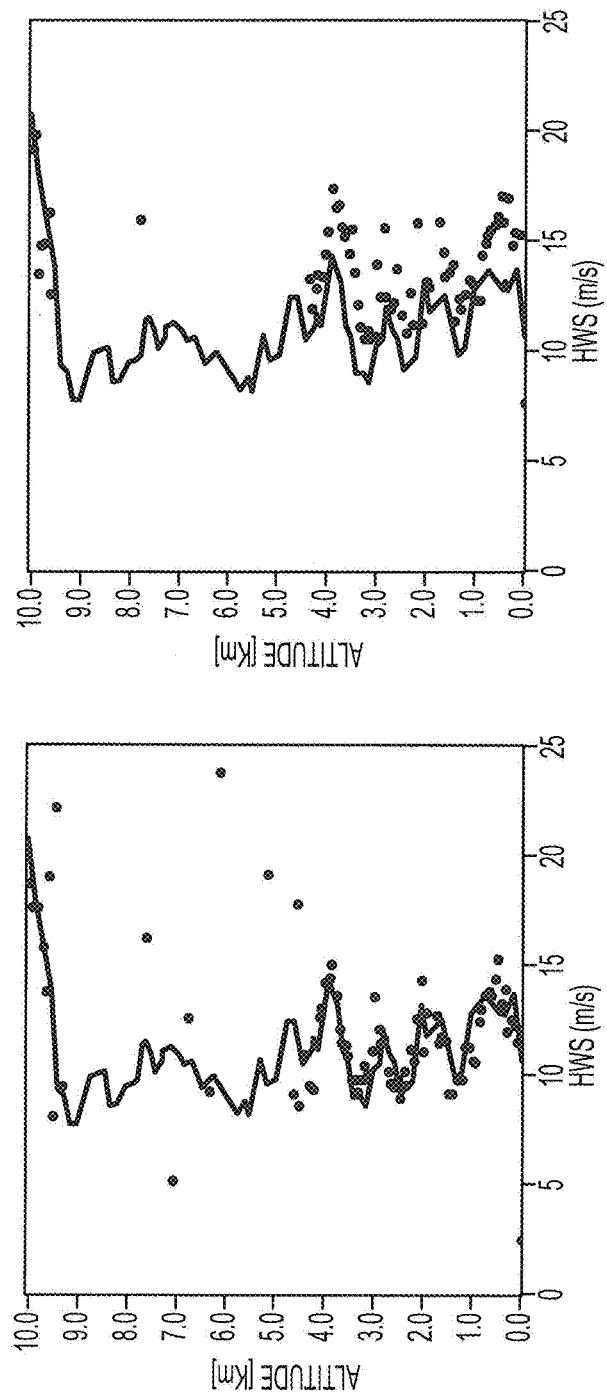
FIG. 11 illustrates a comparison between graphs of APOLO and a 5 LOS based wind speed data and dropsonde wind speed data with offset compensation applied.
Figure 12:
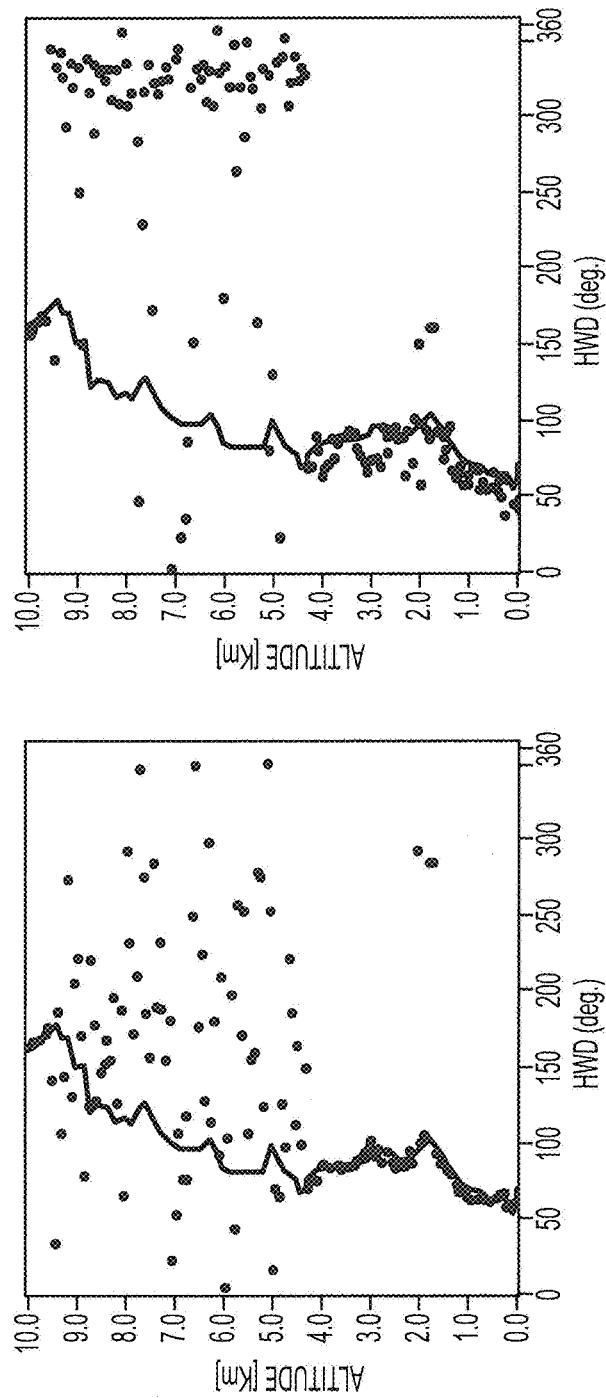
FIG. 12 illustrates a comparison between graphs of APOLO and a 5 LOS based wind direction data and dropsonde wind direction data with offset compensation applied.

However, HWS and HWD of the second five line of sight algorithm are compared with those of APOLO in FIGS. 11 and 12. FIG. 11 illustrates the HWS from APOLO in the left and the second five line of sight algorithm on the right. Offset compensation was applied in both plots. The data was taken during the GRIP mission on the DC8. FFT size was 4096 with zero padding. Altitude=10,608 meters. The solid line represents dropsonde data, and dots are the estimates from APOLO (left) and the second five line of sight algorithm (right). FIG. 11 compares HWS from APOLO (left) with that from the second five line of sight algorithm (right). The same data were used in this comparison, and dropsonde measurements are shown for a reference purpose again. FIG. 12 compares HWD in the same fashion. FIG. 12 shows HWD from APOLO in the left graph and the second five line of sight algorithm in the right graph. Offset compensation was applied during the GRIP mission on the DC8. FFT size was 4096 with zero padding. Altitude was 10,608 meters. The line represents dropsonde data, and black dots are the estimates from APOLO on the left and the second five line of sight algorithm on the right.

Figure 13:
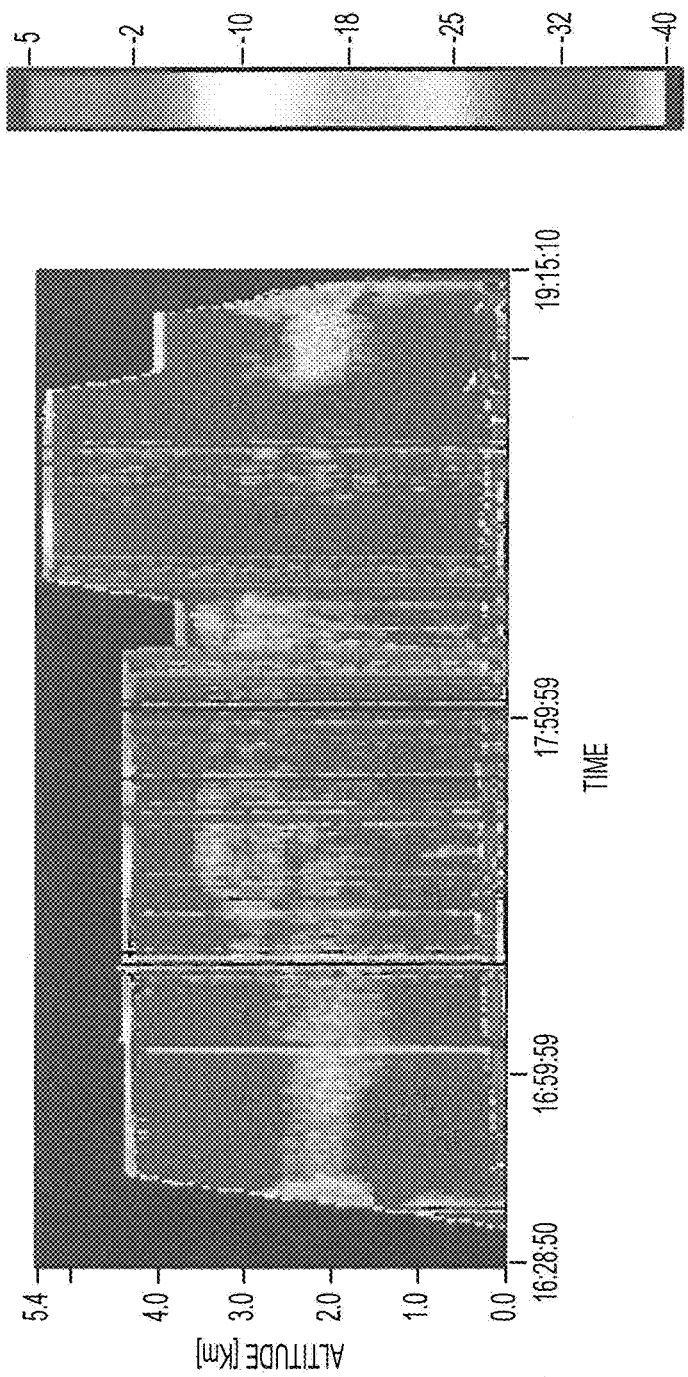
FIG. 13 is a graph of aerosol layer distribution over time based on APOLO data with offset compensation applied.
Figure 14:
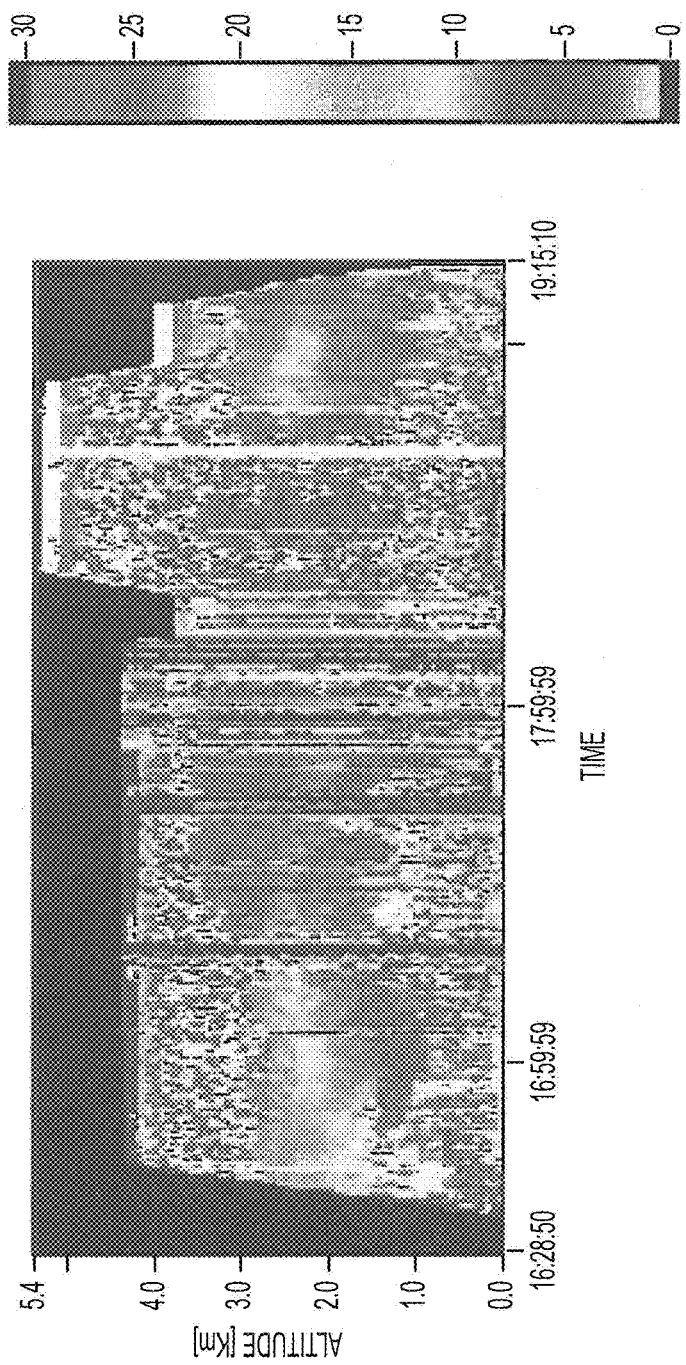
FIG. 14 is a graph of wind speed over time based on APOLO data with offset compensation applied.
Figure 15:
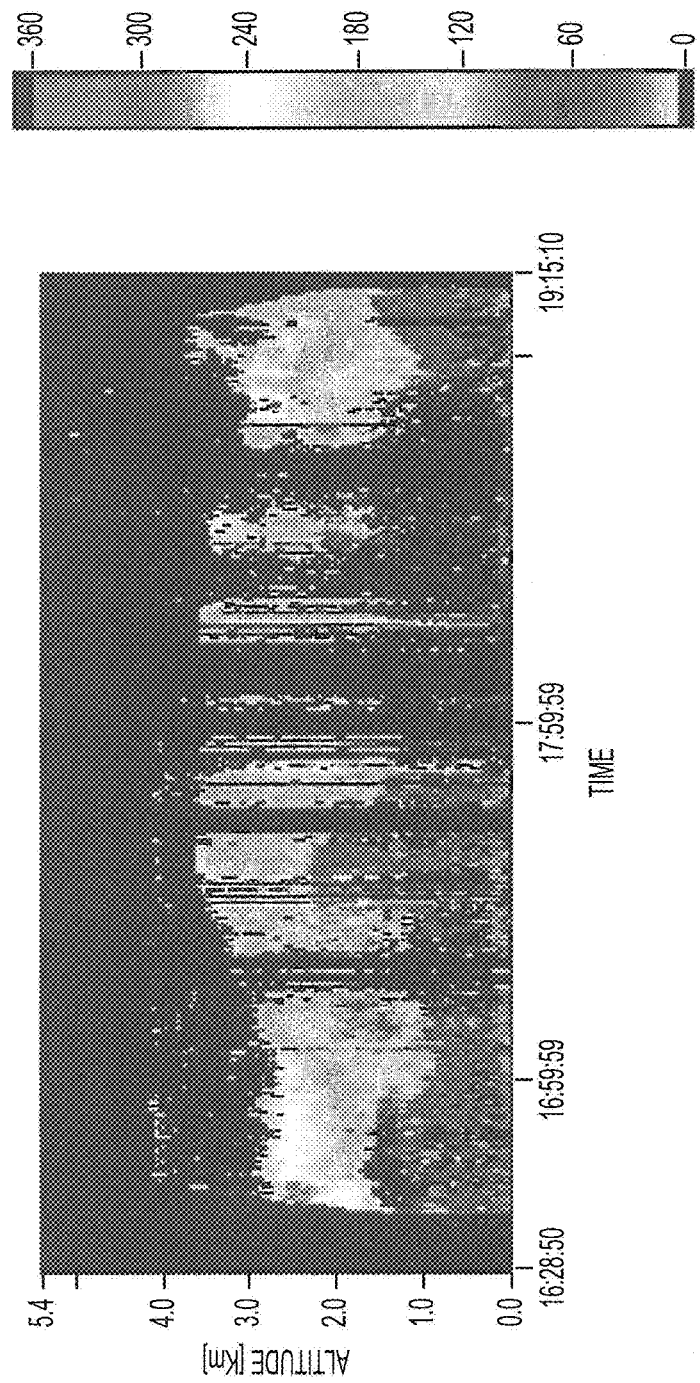
FIG. 15 is a graph of wind direction over time based on APOLO data with offset compensation applied.

FIG. 13-15 show panoramic displays of power, HWS, and HWD during the flight demonstration in a UC-12B aircraft and flew at lower altitudes than the GRIP hurricane campaign. The time stamps are in Zulu time and the images were generated in software developed for post processing to create a long-haul observation displays as shown. FIG. 13 is a panoramic display of power distribution from the flight campaign on the UC-12B. The algorithm used was APOLO with offset compensation applied and a FFT size of 512. FIG. 14 is a panoramic display of HWS from the flight campaign on the UC-12B. The algorithm used was APOLO with offset compensation applied and a FFT size of 512. FIG. 15 is a panoramic display of HWD from the flight campaign on the UC-12B. The algorithm used was APOLO with offset compensation applied and a FFT size of 512. The aircraft flight track on the day the data in FIGS. 13-15 was gathered was from Hampton, Va. to Charlotte, N.C. and back. While over Charlotte the aircraft made multiple overpasses of a ground-based wind profiling radar for comparing the measurements of the two sensors. The power spectral density time trend of FIG. 13 reveals cloud and aerosol structure through the course of the flight with an aerosol layer evident from 1.5 to 3.5-km altitude throughout most of the flight. The horizontal wind speed trend of FIG. 14 shows a horizontal wind magnitude vertical shear at around 1-km altitude, typical of the transition from the atmospheric boundary layer (where the wind speed is about 5-m/s in this case) to the free troposphere (where the wind speed is about 15-m/s in this case). The wind direction plot of FIG. 15 shows a wind direction from the northwest in the free troposphere above 1-km altitude, but a more southerly direction in the low altitudes in the more turbulent atmospheric boundary layer below 1-km altitude, a horizontal wind direction vertical shear.

Figure 16:
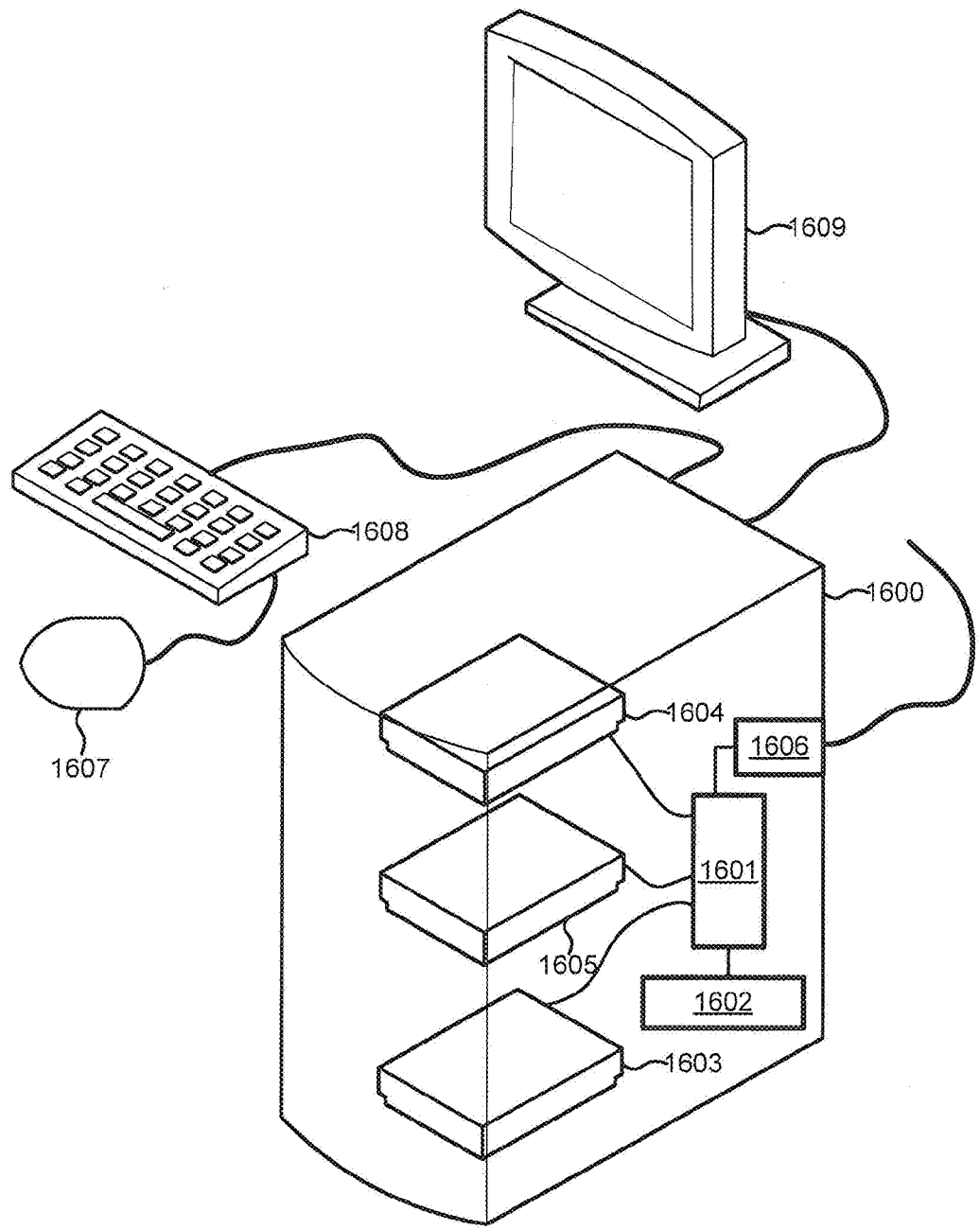
FIG. 16 is a component block diagram of a computing device suitable for use with the various embodiments.

The various embodiments may be implemented in any of a variety of computer devices, an example of which is illustrated in FIG. 16. A computer device 1600 will typically include a processor 1601 coupled to volatile memory 1602 and a large capacity nonvolatile memory, such as a disk drive 1605 of Flash memory. The computer device 1600 may also include a floppy disc drive 1603 and a compact disc (CD) drive 1604 coupled to the processor 1601. The computer device 1600 may also include a number of connector ports 1606 coupled to the processor 1601 for establishing data connections or receiving external memory devices, such as a USB or FireWire® connector sockets, or other network connection circuits for coupling the processor 1601 to a network or bus. The computer device 1600 may also include the trackball 1607, keyboard 1608 and display 1609 all coupled to the processor 1601.

The processor 1601 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1602 and/or 1605 before they are accessed and loaded into the processor 1601. The processor 1601 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1601 including internal memory or removable memory plugged into the device and memory within the processor 1601 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An airborne wind profiling method performed by an aircraft mounted system comprising an airborne Doppler Wind LIDAR system, a INS/GPS system, and a computing device connected to the airborne Doppler Wind LIDAR system and the INS/GPS system, the computing device comprising a display, a memory, and a processor connected to the display and the memory, the method comprising:

receiving airborne Doppler Wind LIDAR data and associated INS/GPS data, wherein the Doppler Wind LIDAR data includes data segments for two or more lines of sight;

distributing the data segments of each line of sight into range gate bins;

determining a power spectra of each range gate bin;

performing a data validity test based at least in part on the power spectra of each range gate bin to determine a reference signal for each of the data segments;

determining a frequency change from the reference signal for each of the data segments;

determining a zero Doppler alignment for each of the data segments based on the frequency change;

determining a power frequency for each of the data segments based on the data segment's zero Doppler alignment;

determining a Doppler shift f for each line of sight based on the line of sight's respective maximum power frequency;

determining a power spectra p for each line of sight based on the line of sight's respective maximum power magnitude;

determining a line of sight range for each line of sight;

plotting the line of sight range for each line of sight versus the line of sight's Doppler shift f and power spectra p;

determining east, north, and up wind components for each line of sight based on the plot of the line of sight range for each line of sight versus the line of sight's Doppler shift f and power spectra p;

computing a wind speed and a wind direction using the east, north, and up wind components for each line of sight;

computing an altitude based on the INS/GPS data and line of sight range for each line of sight; and plotting the wind speed versus the altitude and the wind direction versus the altitude on the display.

2. The method of claim 1, wherein determining a power frequency for each of the data segments based on the data segment's zero Doppler alignment comprises:
counting a number of pulse returns Q that have passed the data validity test; and
determining the power frequency for each of the data segments as a value Y equal to $\{Y_1 \ldots Y_M\}$ wherein $$Y_m(f) = \frac{1}{Q}\sum_{n=0}^{Q-1} \hat{X}_{m,n}(f), m = 1:M,$$

M is a number of range gate bins, n is the data segment number, and $\hat{X}_{m,n}(f)$ is the zero Doppler alignment.

3. The method of claim 2, wherein:
determining a Doppler shift f for each line of sight based on the line of sight's respective maximum power frequency comprises determining the Doppler shift f as a value equal to $\{f_1 \ldots f_M\}$ wherein $$f_m = f_{0,K} + \max_{f \geq F}[Y_m(f)] - 100 \text{ MHz}, m = 1:M,$$

$f_{0,K}$ is the reference signal, and F is a nominal value in Hz; and
determining a power spectra p for each line of sight based on the line of sight's respective maximum power frequency comprises determining the power spectra p as a value equal to $\{p_1 \ldots p_M\}$ wherein
$p_m = \max[Y_m(f)], f \geq F$, and $m = 1:M$.

4. The method of claim 3, wherein the associated INS/GPS data includes an aircraft speed east value ($V_{AE}$), an aircraft speed north value ($V_{AN}$), an aircraft speed up value ($V_{AU}$), an aircraft roll value, an aircraft pitch value, and an aircraft heading value for each segment for the two or more lines of sight, and
wherein determining east, north, and up wind components for each line of sight based on the plot of the line of sight range for each line of sight versus the line of sight's Doppler shift f and power spectra p comprises determining speed east ($V_{WE}$), speed north ($V_{WN}$), and speed up ($V_{WU}$) wind components for each line of sight (d) as vectors defined by:

$$v_W(N, E, U)_m^{(d)} = \begin{bmatrix} V_{WN,m}^{(d)} \\ V_{WE,m}^{(d)} \\ V_{WU,m}^{(d)} \end{bmatrix},$$

Wherein wind components speed east ($V_{WE}$), speed north ($V_{WN}$), and speed up ($V_{WU}$) are determined by:
converting $$\tan^{-1}\left(\frac{V_{AN}}{V_{AE}}\right)$$

to an angle from N;
determining an aircraft yaw value as the aircraft heading value minus the angle from N;
translating the aircraft vector for each range gate bin in reference to an adjusted aircraft axis using the aircraft speed east value ($V_{AE}$), the aircraft speed north value ($V_{AN}$), the aircraft speed up value ($V_{AU}$), the aircraft roll value, the aircraft pitch value, the aircraft heading value, the aircraft yaw value, and roll, pitch, yaw, elevation, and azimuth offset values;
estimating wind (W) components in reference to the adjusted aircraft axis based on the Doppler shift f for each range gate bin and the translated aircraft vector for each range gate bin; and
translating the wind (W) components in reference to the adjusted aircraft axis into Earth reference wind components speed east ($V_{WE}$), speed north ($V_{WN}$), and speed up ($V_{WU}$).

5. The method of claim 4, wherein the roll, pitch, yaw, elevation, and azimuth offset values are estimated at least in part on a Doppler shift in a reference ground return range bin and a translated aircraft vector for the reference ground return range bin.

6. The method of claim 5, wherein the Doppler Wind LIDAR data includes data segments for only two lines of sight which are perpendicular to each other, and wherein computing a wind speed and a wind direction using the east, north, and up wind components for each line of sight comprises:
adding the wind components for each line of sight such that:
the wind speed is equal to:

$$\sqrt{(V_{WN,m}^{(1)} + V_{WN,m}^{(5)})^2 + (V_{WE,m}^{(1)} + V_{WE,m}^{(5)})^2},$$

$m = 1:M;$ and
the wind direction is equal to:

$$\text{mod}(90° - (HWD_m)_{math}, 360°),$$

where $(HWD_m)_{math} = 360° + \delta_m$ if $\delta_m < 0$ otherwise $(HWD_m)_{math} = \delta_m$, $$m = 1:M \text{ and } \delta_m = \tan^{-1}\left(\frac{V_{WN,m}^{(1)} + V_{WN,m}^{(5)}}{V_{WE,m}^{(1)} + V_{WE,m}^{(5)}}\right).$$

7. An aircraft mounted system, comprising:
an airborne Doppler Wind LIDAR system;
INS/GPS system; and
a computing device connected to the airborne Doppler Wind LIDAR system and INS/GPS system, the computing device comprising:
a display;
a memory; and
a processor connected to the display and the memory, wherein the processor is configured with processor-executable instructions to perform operations comprising:
receiving airborne Doppler Wind LIDAR data from the airborne Doppler Wind LIDAR system and associated INS/GPS data from the INS/GPS system, wherein the Doppler Wind LIDAR data includes data segments for two or more lines of sight;

distributing the data segments of each line of sight into range gate bins;

determining a power spectra of each range gate bin;

performing a data validity test based at least in part on the power spectra of each range gate bin to determine a reference signal for each of the data segments;

determining a frequency change from the reference signal for each of the data segments;

determining a zero Doppler alignment for each of the data segments based on the frequency change;

determining a power frequency for each of the data segments based on the data segment's zero Doppler alignment;

determining a Doppler Shift f for each line of sight based on the line of sight's respective maximum power frequency;

determining a power spectra p for each line of sight based on the line of sight's respective maximum power magnitude;

determining a line of sight range for each line of sight;

plotting the line of sight range for each line of sight versus the line of sight's Doppler shift f and power spectra p on the display;

determining east, north, and up wind components for each line of sight based on the plot of the line of sight range for each line of sight versus the line of sight's Doppler shift f and power spectra p;

computing a wind speed and a wind direction using the east, north, and up wind components for each line of sight;

computing an altitude based on the INS/GPS data and line of sight range for each line of sight; and plotting the wind speed versus the altitude and the wind direction versus the altitude on the display.

8. The system of claim 7, wherein the processor is configured with processor executable instructions to perform operations such that determining a power frequency for each of the data segments based on the data segment's zero Doppler alignment comprises:

counting a number of pulse returns Q that have passed the data validity test; and determining the power frequency for each of the data segments as a value Y equal to $\{Y_1 \ldots Y_M\}$ wherein $$Y_m(f) = \frac{1}{Q}\sum_{n=0}^{Q-1} \hat{X}_{m,n}(f),$$

$$m = 1:M,$$

M is a number of range gate bins, n is the data segment number, and $\hat{X}_{m,n}(f)$ is the zero Doppler alignment.

9. The system of claim 8, wherein the processor is configured with processor-executable instructions to perform operations such that:

determining a Doppler shift f for each line of sight based on the line of sight's respective maximum power frequency comprises determining the Doppler shift f as a value equal to $\{f_1 \ldots f_M\}$ wherein $$f_m = f_{0,K} + \max_{f \geq F}[Y_m(f)] - 100 \text{ MHz}, m = 1:M,$$

$f_{0,K}$ is the reference signal, and F is a nominal value in Hz; and determining a power spectra p for each line of sight based on the line of sight's respective maximum power frequency comprises determining the power spectra p as a value equal to $\{p_1 \ldots p_M\}$ wherein $p_m = \max[Y_m(f)], f \geq F$, and $m = 1:M$.

10. The system of claim 9, wherein the processor is configured with processor-executable instructions to perform operations such that:

the associated INS/GPS data includes an aircraft speed east value ($V_{AE}$), an aircraft speed north value ($V_{AN}$), an aircraft speed up value ($V_{AU}$), an aircraft roll value, an aircraft pitch value, and an aircraft heading value for each segment for the two or more lines of sight, and determining east, north, and up wind components for each line of sight based on the plot of the line of sight range for each line of sight versus the line of sight's Doppler shift f and power spectra p comprises determining speed east ($V_{WE}$), speed north ($V_{WN}$), and speed up ($V_{WU}$) wind components for each line of sight (d) as vectors defined by:

$$v_W(N, E, U)_m^{(d)} = \begin{bmatrix} V_{WN,m}^{(d)} \\ V_{WE,m}^{(d)} \\ V_{WU,m}^{(d)} \end{bmatrix},$$

wherein wind components speed east ($V_{WE}$), speed north ($V_{WN}$), and speed up ($V_{WU}$) are determined by converting $$\tan^{-1}\left(\frac{V_{AN}}{V_{AE}}\right)$$

to an angle from N;

determining an aircraft yaw value as the aircraft heading value minus the angle from N;

translating the aircraft vector for each range gate bin in reference to an adjusted aircraft axis using the aircraft speed east value ($V_{AE}$), the aircraft speed north value ($V_{AN}$), the aircraft speed up value ($V_{AU}$), the aircraft roll value, the aircraft pitch value, the aircraft heading value, the aircraft yaw value, and roll, pitch, yaw, elevation, and azimuth offset values;

estimating wind (W) components in reference to the adjusted aircraft axis based on the Doppler shift f for each range gate bin and the translated aircraft vector for each range gate bin; and translating the wind (W) components in reference to the adjusted aircraft axis into Earth reference wind components speed east ($V_{WE}$), speed north ($V_{WN}$), and speed up ($V_{WU}$).

11. The system of claim 10, wherein the processor is configured with processor-executable instructions to perform operations such that the roll, pitch, yaw, elevation, and azimuth offset values are estimated at least in part on a Doppler shift in a reference ground return range bin and a translated aircraft vector for the reference ground return range bin.

12. The system of claim 11, wherein the processor is configured with processor-executable instructions to perform operations such that the Doppler Wind LIDAR data includes data segments for only two lines of sight which are perpendicular to each other, and wherein computing a wind speed and a wind direction using the east, north, and up wind components for each line of sight comprises:
adding the wind components for each line of sight such that:
the wind speed is equal to:

$$\sqrt{(V_{WN,m}^{(1)} + V_{WN,m}^{(5)})^2 + (V_{WE,m}^{(1)} + V_{WE,m}^{(5)})^2},$$
$$m = 1 : M;$$

and
the wind direction is equal to:

$\mod(90° - (HWD_m)_{math}, 360°)$, where $(HWD_m)_{math} = 360° + \delta_m$ if $\delta_m < 0$ otherwise $(HWD_m)_{math} = \delta_m$, $m = 1 : M$ and $\delta_m = \tan^{-1}\left(\dfrac{V_{WN,m}^{(1)} + V_{WN,m}^{(5)}}{V_{WE,m}^{(1)} + V_{WE,m}^{(5)}}\right)$.

13. A non-transitory processor readable medium having stored thereon processor-executable instructions configured to cause a processor of a computing device of an aircraft mounted system comprising an airborne Doppler Wind LIDAR system and a INS/GPS system connected to computing device to perform operations comprising:
receiving airborne Doppler Wind LIDAR data and associated INS/GPS data, wherein the Doppler Wind LIDAR data includes data segments for two or more lines of sight;
distributing the data segments of each line of sight into range gate bins;
determining a power spectra of each range gate bin;
performing a data validity test based at least in part on the power spectra of each range gate bin to determine a reference signal for each of the data segments;
determining a frequency change from the reference signal for each of the data segments;
determining a zero Doppler alignment for each of the data segments based on the frequency change;
determining a power frequency for each of the data segments based on the data segment's zero Doppler alignment;
determining a Doppler shift f for each line of sight based on the line of sight's respective maximum power frequency;
determining a power spectra p for each line of sight based on the line of sight's respective maximum power magnitude;
determining a line of sight range for each line of sight;
plotting the line of sight range for each line of sight versus the line of sight's Doppler shift f and power spectra p;
determining east, north, and up wind components for each line of sight based on the plot of the line of sight range for each line of sight versus the line of sight's Doppler shift f and power spectra p;
computing a wind speed and a wind direction using the east, north, and up wind components for each line of sight;

computing an altitude based on the INS/GPS data and line of sight range for each line of sight; and
plotting the wind speed versus the altitude and the wind direction versus the altitude on a display connected to the processor.

14. The non-transitory processor readable medium of claim 13, wherein the stored processor-executable instructions are configured to cause the processor to perform operations such that determining a power frequency for each of the data segments based on the data segment's zero Doppler alignment comprises:
counting a number of pulse returns Q that have passed the data validity test; and
determining the power frequency for each of the data segments as a value Y equal to $\{Y_1 \ldots Y_M\}$ wherein $$Y_m(f) = \frac{1}{Q}\sum_{n=0}^{Q-1} \hat{X}_{m,n}(f),$$

$m = 1 : M,$

M is a number of range gate bins, n is the data segment number, and $\hat{X}_{m,n}(f)$ is the zero Doppler alignment.

15. The non-transitory processor readable medium of claim 14, wherein the stored processor-executable instructions are configured to cause the processor to perform operations such that:
determining a Doppler shift f for each line of sight based on the line of sight's respective maximum power frequency comprises determining the Doppler shift f as a value equal to $\{f_1 \ldots f_M\}$ wherein $$f_m = f_{0,K} + \max_{f \geq F}[Y_m(f)] - 100 \text{ MHz}, m = 1 : M,$$

$f_{0,K}$ is the reference signal, and F is a nominal value in Hz; and
determining a power spectra p for each line of sight based on the line of sight's respective maximum power frequency comprises determining the power spectra p as a value equal to $\{p_1 \ldots p_M\}$ wherein $p_m = \max[Y_m(f)], f \geq F$, and $m = 1:M$.

16. The non-transitory processor readable medium of claim 15, wherein the stored processor-executable instructions are configured to cause the processor to perform operations such that:
the associated INS/GPS data includes an aircraft speed east value ($V_{AE}$), an aircraft speed north value ($V_{AN}$), an aircraft speed up value ($V_{AU}$), an aircraft roll value, an aircraft pitch value, and an aircraft heading value for each segment for the two or more lines of sight, and
determining east, north, and up wind components for each line of sight based on the plot of the line of sight range for each line of sight versus the line of sight's Doppler shift f and power spectra p comprises determining speed east ($V_{WE}$), speed north ($V_{WN}$), and speed up ($V_{WU}$) wind components for each hue of sight (d) as vectors defined by:

$$v_W(N, E, U)_m^{(d)} = \begin{bmatrix} V_{WN,m}^{(d)} \\ V_{WE,m}^{(d)} \\ V_{WU,m}^{(d)} \end{bmatrix},$$

wherein wind components speed east ($V_{WE}$), speed north ($V_{WN}$), and speed up ($V_{WU}$) are determined by:
convertin $$\tan^{-1}\left(\frac{V_{AN}}{V_{AE}}\right)$$

to an angle from N;
    determining an aircraft yaw value as the aircraft heading value minus the angle from N;
    translating the aircraft vector for each range gate bin in reference to an adjusted aircraft axis using the aircraft speed east value ($V_{AE}$), the aircraft speed north value ($V_{AN}$), the aircraft speed up value ($V_{AU}$), the aircraft roll value, the aircraft pitch value, the aircraft heading value, the aircraft yaw value, and roll, pitch, yaw, elevation, and azimuth offset values;
    estimating wind (W) components in reference to the adjusted aircraft axis based on the Doppler shift f for each range gate bin and the translated aircraft vector for each range gate bin; and
    translating the wind (W) components in reference to the adjusted aircraft axis into Earth reference wind components speed east ($V_{WE}$), speed north ($V_{WN}$), and speed up ($V_{WU}$).

17. The non-transitory processor readable medium of claim 16, wherein the stored processor-executable instructions are configured to cause the processor to perform operations such that the roll, pitch, yaw, elevation, and azimuth offset values are estimated at least in part on a Doppler shift in a reference ground return range bin and a translated aircraft vector for the reference ground return range bin.

18. The non-transitory processor readable medium of claim 17, wherein the stored processor-executable instructions are configured to cause the processor to perform operations such that the Doppler Wind LIDAR data includes data segments for only two lines of sight which are perpendicular to each other, and wherein computing a wind speed and a wind direction using the east, north, and up wind components for each line of sight comprises:
    adding the wind components for each line of sight such that:
    the wind speed is equal to:

$$\sqrt{(V_{WN,m}^{(1)} + V_{WN,m}^{(5)})^2 + (V_{WE,m}^{(1)} + V_{WE,m}^{(5)})^2},$$
$$m = 1:M;$$

and
    the wind direction is equal to $$\mod(90° - (HWD_m)_{math}, 360°),$$

where $(HWD_m)_{math} = 360° + \delta_m$ if $\delta_m < 0$ otherwise $(HWD_m)_{math} = \delta_m$, $$m = 1:M \text{ and } \delta_m = \tan^{-1}\left(\frac{V_{WN,m}^{(1)} + V_{WN,m}^{(5)}}{V_{WE,m}^{(1)} + V_{WE,m}^{(5)}}\right).$$

* * * * *